US012603280B2

(12) United States Patent (10) Patent No.: US 12,603,280 B2
Tak et al. (45) Date of Patent: Apr. 14, 2026

(54) SULFUR CATHODES, SULFUR CATHODE MATERIALS, AND APPARATUS AND METHODS FOR MAKING SAME

(71) Applicant: CarbonIP Technologies Inc., Port Coquitlam (CA)

(72) Inventors: Jin Kwon Tak, Vegreville (CA); Earl Jenson, Vegreville (CA)

(73) Assignee: CarbonIP Technologies Inc., Port Coquitlam (CA)

( * ) Notice: Subject to any disclaimer, the term of this patent is extended or adjusted under 35 U.S.C. 154(b) by 243 days.

(21) Appl. No.: 18/009,299

(22) PCT Filed: Jun. 10, 2021

(86) PCT No.: PCT/CA2021/050792
§ 371 (c)(1),
(2) Date: Dec. 8, 2022

(87) PCT Pub. No.: WO2021/248245
PCT Pub. Date: Dec. 16, 2021

(65) Prior Publication Data
US 2023/0223519 A1 Jul. 13, 2023

Related U.S. Application Data

(60) Provisional application No. 63/038,640, filed on Jun. 12, 2020.

(51) Int. Cl.
*H01M 4/36* (2006.01)
*C01B 32/372* (2017.01)
(Continued)

(52) U.S. Cl.
CPC ........... *H01M 4/366* (2013.01); *C01B 32/372* (2017.08); *H01M 4/133* (2013.01); *H01M 4/38* (2013.01);
(Continued)

(58) Field of Classification Search
CPC ........ H01M 4/366; H01M 4/133; H01M 4/38; H01M 4/583; H01M 10/052;
(Continued)

(56) References Cited

U.S. PATENT DOCUMENTS 4,701,212 A 10/1987 Yan
4,708,853 A 11/1987 Matviya et al.
(Continued)

FOREIGN PATENT DOCUMENTS

CN 1021661 C 7/1993
CN 101587951 A 11/2009
(Continued)

OTHER PUBLICATIONS

Manoj et al. "Biomass-derived, activated carbon-sulfur composite cathode with a bifunctional interlayer of functionalized carbon nanotubes for lithium-sulfur cells" Journal of Colloid and Interface Science 535 (2019) 287-299. (Year: 2019).*
(Continued)

*Primary Examiner* — Robert S Walters, Jr.
(74) *Attorney, Agent, or Firm* — Viridant IP

(57) ABSTRACT

A method for embedding sulfur into conductive carbon is provided. Elemental sulfur is dissolved in liquid ammonia to form a sulfur-ammonia solution. Conductive carbon is soaked in the sulfur-ammonia solution to embed the conductive carbon with the dissolved sulfur. The liquid ammonia in the sulfur-ammonia solution can be removed as gaseous ammonia to yield sulfur-embedded conductive carbon. The sulfur-embedded conductive carbon can be used to manufacture sulfur cathodes. Such sulfur cathodes and batteries incorporating such sulfur cathodes are provided.

22 Claims, 14 Drawing Sheets

(51) Int. Cl.

| | |
|---|---|
| *H01M 4/133* | (2010.01) |
| *H01M 4/38* | (2006.01) |
| *H01M 4/583* | (2010.01) |
| *H01M 10/052* | (2010.01) |
| *H01M 4/02* | (2006.01) |

(52) U.S. Cl.
CPC ......... *H01M 4/583* (2013.01); *H01M 10/052* (2013.01); *C01P 2004/80* (2013.01); *C01P 2006/40* (2013.01); *H01M 2004/028* (2013.01)

(58) Field of Classification Search
CPC ............ H01M 2004/028; C01B 32/372; C01P 2004/80; C01P 2006/40
See application file for complete search history.

(56) References Cited

U.S. PATENT DOCUMENTS

| | | | |
|---|---|---|---|
| 5,028,343 A | 7/1991 | Lindstrom | |
| 7,998,898 B2 | 8/2011 | Gadkarec et al. | |
| 8,431,106 B2 | 4/2013 | Abry et al. | |
| 8,696,931 B2 | 4/2014 | Mamiya et al. | |
| 8,741,243 B2 | 6/2014 | Gadkaree et al. | |
| 8,758,914 B2 | 6/2014 | De Jonghe et al. | |
| 9,517,935 B2 | 12/2016 | Abry et al. | |
| 9,923,200 B2 | 3/2018 | Wang et al. | |
| 10,381,680 B2 | 8/2019 | Jung et al. | |
| 10,629,320 B2 | 4/2020 | Haag | |
| 2010/0150817 A1 | 6/2010 | Abry | |
| 2010/0239479 A1 | 9/2010 | Gadkaree et al. | |
| 2011/0002086 A1 | 1/2011 | Feaver et al. | |
| 2011/0159375 A1 | 6/2011 | Feaver et al. | |
| 2012/0088154 A1 | 4/2012 | Liu et al. | |
| 2012/0115048 A1 | 5/2012 | Roev et al. | |
| 2013/0065127 A1 | 3/2013 | Nazar et al. | |
| 2013/0164635 A1 | 6/2013 | Schmidt et al. | |
| 2014/0017394 A1 | 1/2014 | Wegner et al. | |
| 2014/0113200 A1 | 4/2014 | Seymour | |
| 2014/0186522 A1 | 7/2014 | Woo et al. | |
| 2014/0186695 A1 | 7/2014 | Moganty et al. | |
| 2014/0212771 A1 | 7/2014 | Garsuch et al. | |
| 2014/0234723 A1 | 8/2014 | Hagen et al. | |
| 2015/0075326 A1 | 3/2015 | Despen et al. | |
| 2015/0140420 A1 | 5/2015 | Sun et al. | |
| 2015/0155549 A1 | 6/2015 | Moganty et al. | |
| 2016/0087266 A1 | 3/2016 | Muldoon et al. | |
| 2016/0190547 A1 | 6/2016 | Schweiss | |
| 2016/0240840 A1 | 8/2016 | He et al. | |
| 2016/0365581 A1 | 12/2016 | Dai et al. | |

FOREIGN PATENT DOCUMENTS

| | | | |
|---|---|---|---|
| CN | 102544521 A | 7/2012 | |
| CN | 103155243 A | 6/2013 | |
| CN | 102280614 B | 8/2013 | |
| CN | 103700818 A | 4/2014 | |
| CN | 103746096 A | 4/2014 | |
| CN | 104638264 A | 5/2015 | |
| CN | 103700859 B | 1/2016 | |
| CN | 103746101 B | 3/2016 | |
| CN | 105375000 A | 3/2016 | |
| CN | 105375001 A | 3/2016 | |
| CN | 103730641 B | 5/2016 | |
| CN | 104701498 B | 11/2016 | |
| CN | 104253276 B | 12/2016 | |
| CN | 103746095 B | 1/2017 | |
| CN | 104409733 B | 1/2017 | |
| CN | 105336963 B | 10/2017 | |
| CN | 105355894 B | 4/2018 | |
| CN | 108975280 A | 12/2018 | |
| CN | 105374999 B | 3/2019 | |
| CN | 108793083 B | 1/2020 | |
| CN | 108448101 B | 6/2020 | |
| TW | 201308735 A | 2/2013 | |
| TW | 201603350 A | 1/2016 | |
| WO | 2011131584 A1 | 10/2011 | |
| WO | 2012047329 A2 | 4/2012 | |
| WO | 2012100301 A1 | 8/2012 | |
| WO | 2012149672 A1 | 11/2012 | |
| WO | 2013008166 A1 | 1/2013 | |
| WO | 2013142528 A1 | 9/2013 | |
| WO | 2013169811 A2 | 11/2013 | |
| WO | 2016116542 A1 | 7/2016 | |
| ZA | 200509715 B1 | 3/2007 | |

OTHER PUBLICATIONS

Guo, Juchen, Yunhua Xu, and Chunsheng Wang. "Sulfur-impregnated disordered carbon nanotubes cathode for lithium-sulfur batteries." Nano letters 11.10 (2011): 4288-4294.

Sun et al. "Sulfur embedded in a mesoporous carbon nanotube network as a binder-free electrode for high-performance lithium-sulfur batteries." ACS nano 10.1 (2016): 1300-1308.

Dubois, P., J. P. Lelieur, and G. Lepoutre. "The solubilization process of sulfur in liquid ammonia and the equilibrium state of these solutions." Inorganic Chemistry 28.2 (1989): 195-200. (Abstract).

Lelieur, J. P., A. Demortier, and E. Levillain. "Recent developments in the understanding of solutions of sulfur in liquid ammonia." Le Journal de Physique IV 1.C5 (1991): C5-209 to C5-215.

Lagowski, J. J. "Solution phenomena in liquid ammonia." Pure and Applied Chemistry 25.2 (1971): 429-456.

N. Rey-Raap et. Al Measurement, An Electrical Conductivity Translator for Carbons, 2014, 56, 215-218.

Helmenstine, ThoughtCo. Table of Electrical Resistivity and Conductivity, 608499, Jun. 27, 2019.

Fabiano Gomes Ferreira de Paula et.al., Structural Flexibility in Activated Carbon Materials Prepared under Harsh Activation Conditions, Materials 2019, 12, 1988.

A. Barroso-Bogeat et. al., Electrical conductivity of activated carbon-metal oxide nanocomposites under compression: a comparison study, Phys. Chem. Chem. Phys., 2014, 16, 25161-25175.

https://en.wikipedia.org/wiki/Ammonia_(data_page). Online, accessed Dec. 5, 2023.

Nazar et al., 2014, Lithium-sulfur batteries, MRS Bulletin, vol. 39.

Lin and Liang, 2015, J. Materials Chemistry A, 3:936-958.

Fotouhi, et al., 2017, Energies, 10:1937.

Wang et al., Carbon-sulfur composites for Li—S batteries: status and prospects, J. Mater. Chem. A., 2013, 1, 9382-9394.

Sun et al., "Lithium-sulfur batteries based on nitrogen-doped carbon and an ionic-liquid electrolyte", ChemSusChem, 2012, 5(10), 2079-2085.

Zheng Jianming et al: "How to Obtain Reproducible Results for Lithium Sulfur Batteries?", Journal of the Electrochemical Society, vol. 160, No. 11, Jan. 16, 2013, XP093274224.

\* cited by examiner

S11-6: CAC+50%S tested at soluble voltage range (75% DoD)

● Discharge capacity (mAh/g)    ▲ Capacity retention (%)

SULFUR CATHODES, SULFUR CATHODE MATERIALS, AND APPARATUS AND METHODS FOR MAKING SAME

CROSS-REFERENCE TO RELATED APPLICATIONS

This application is a 371 national phase entry of Patent Cooperation Treaty application No. PCT/CA2021/050792 filed 10 Jun. 2021 entitled SULPHUR CATHODES, SUL-PHUR CATHODE MATERIALS, AND APPARATUS AND METHODS FOR MAKING SAME, which claims priority to, and the benefit of, U.S. provisional patent application No. 63/038,640 filed 12 Jun. 2020 entitled SULPHUR CATH-ODES, APPARATUS AND METHODS FOR MAKING SAME. Both of the foregoing applications are incorporated by reference herein their entireties.

TECHNICAL FIELD

Some embodiments of the present invention relate to apparatus for storing and discharging energy. Some embodiments relate to metal-sulfur batteries and/or metal-sulfur electrodes. Some embodiments relate to a sulfur cathode of a metal-sulfur battery. Some embodiments relate to a sulfur cathode of a lithium-sulfur battery. Some embodiments relate to methods for embedding sulfur into activated carbon. Some embodiments relate to carbon with sulfur embedded therein. Some embodiments relate to batteries having electrodes made from carbon with sulfur embedded therein.

BACKGROUND

Carbon materials such as activated carbon can provide a useful material for the manufacture of electrodes. For example, carbon-based materials can be designed as highly porous materials so as to have a high surface area. The pore sizes in the material can be quite small to provide a high surface area. Carbon materials can also offer good adsorption (i.e. adhesion of ions onto the surface of the material) and low resistance (i.e. efficient electron and ion movement at high current). Examples of potential applications for such carbon materials include batteries, including metal sulfur and lithium-sulfur batteries.

A growing area of interest in rechargeable battery technology is lithium-sulfur (Li—S) batteries. A lithium-sulfur battery has a lithium-metal anode and a sulfur cathode. Sulfur and lithium have theoretical capacities of 1672 or 1675 mA h g$^{-1}$, respectively. As such, a theoretical energy density of a Li—S battery is 2500 Wh kg$^{-1}$, which is one of the highest theoretical energy densities among rechargeable batteries. As such, lithium-sulfur batteries provide a promising electrical energy-storage system for portable electronics and electric vehicles.

Lithium-sulfur batteries operate by reduction of sulfur at the cathode to lithium sulfide: $S+16Li \rightleftharpoons 8Li_2S$ (2.4V-1.7V). The sulfur reduction reaction to lithium sulfide is complex and involves the formation of various lithium polysulfides ($Li_2S_x$, $8<x<1$, e.g. $Li_2S_8$, $Li_2S_6$, $Li_2S_4$, and $Li_2S_2$).

In the case of some lithium-sulfur batteries, the anode can be pure lithium metal (Li° oxidized to Li⁺ during discharge), and in some cases the cathode can be activated carbon containing sulfur (S° reduced to S²⁻ during discharging). An ion-permeable separator is provided between the anode and the cathode, and an electrolyte used in such system is generally based on a mixture of two organic solvents such as 1,2-dimethoxyethane (DME) and 1,3-dioxolane (DOXL)

containing 1 M of lithium bis(trifluoromethane sulfonyl) imide (LIN(SO2CF3)2) and 1% lithium nitrate, or the like.

Potential advantages of lithium-sulfur batteries include a high energy density (theoretically 5 times although practically 2-3 times more than lithium-ion), there is no requirement for top-up charging when in storage (whereas a lithium-ion battery may require 40% regular recharging to prevent capacity loss), the active materials are lighter as compared to lithium-ion, and the materials used in the manufacture of lithium-sulfur batteries are more environmentally friendly and less expensive than lithium-ion batteries (since no rare earth metals are required).

However, there are challenges for lithium-sulfur battery systems that have not yet been addressed sufficiently to make them commercially useful. For example, lithium polysulfides ($Li_2S_x$ where x is an integer between 3 and 8) dissolve in the electrolyte and further reduce to insoluble lithium polysulfides (e.g. $Li_2S_2$ to $Li_2S_1$) that form on the anode in the battery systems. Such formations create a loss of active material, resulting in a short life cycle (i.e. fewer discharging and charge cycles).

Also, because sulfur is electronically and ionically insulating, sulfur needs to be embedded into a conductive matrix to be used in a lithium sulfur battery. Carbon is a potentially useful material for lithium-sulfur battery electrodes because it has a porous structure that supports the deposition of lithium polysulfide, and can help to minimize electrode expansion during discharge.

There remains a need for technologies that improve the capabilities of lithium-sulfur battery systems. Additionally, there is a general desire for improved apparatus and methods for making a sulfur cathode. There is also a general desire for an improved method for embedding sulfur into a conductive matrix such as carbon, e.g. activated carbon.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, a method for embedding sulfur into conductive carbon is provided. The conductive carbon is soaked in a sulfur-ammonia solution to embed the conductive carbon with at least a portion of the sulfur contained in the sulfur-ammonia solution.

In one aspect, a method for embedding sulfur into conductive carbon is provided. Elemental sulfur is dissolved in liquid ammonia to form a sulfur-ammonia solution. The conductive carbon is soaked in the sulfur-ammonia solution to embed the conductive carbon with at least a portion of the dissolved sulfur, and sulfur-embedded conductive carbon is recovered. The conductive carbon can be activated carbon. After the conductive carbon has been soaked in the sulfur-ammonia solution, ammonia can be removed as gaseous ammonia. The gaseous ammonia can be compressed and recycled for further use in the process.

The elemental sulfur can be dissolved in the liquid ammonia in a pressurized environment, for example a pressure of between about 110 psig and 135 psig at room temperature. The elemental sulfur can be dissolved in the liquid ammonia at a temperature of between –20° C. and 20° C. The pressure of the pressurized environment can vary depending on the vapor pressure of ammonia at the selected temperature, e.g. the pressure of the pressurized environment can be between 45 and 55 psig if the temperature is approximate 0° C., or between 10 and 50 psig if the temperature is approximately –20° C. The resultant sulfur-ammonia solution can contain between 5% and 30% by weight dissolved sulfur.

The step of soaking the conductive carbon in the sulfur-ammonia solution can be carried out in a pressurized environment, e.g. having a pressure of about 110 to about 135 psig at room temperature.

The sulfur-embedded conductive carbon may contain between about 30% to about 85% sulfur by weight. The sulfur-embedded conductive carbon can be used to produce a sulfur cathode, e.g. for use in a metal-sulfur battery such as a lithium-sulfur battery. A method of operating such a battery may cycle the battery only to 75% depth-of-discharge (DoD) when charging and discharging the battery to minimize formation of insoluble polysulfides.

An apparatus for embedding sulfur into conductive carbon can have a sulfur dissolving tank having a first inlet for flowing liquid ammonia into the sulfur dissolving tank, a second inlet for loading elemental sulfur into the sulfur dissolving tank, and an outlet for withdrawing a sulfur-ammonia solution from the sulfur dissolving tank; and a sulfur impregnating tank in selective fluid communication with the sulfur dissolving tank, the sulfur impregnating tank having a first inlet connected to the outlet of the sulfur dissolving tank, a second inlet for adding conductive carbon into the sulfur impregnating tank, a release valve for evaporating the liquid ammonia, and a release conduit for discharging gaseous ammonia.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 12A shows ES ratio versus capacity. FIG. 12B shows ES ratio versus initial open-circuit potential (OCP). FIG. 12C shows initial open-circuit potential (OCP) versus capacity.

FIG. 14A shows a cell cycled at a depth of discharge (DoD) of 75% (after two cycles at 100% DoD) and FIG. 14B shows a cell cycled at a depth of discharge (DoD) of 100%. FIG. 14C shows capacity and FIG. 14D shows percentage capacity retention for the 40th to the 500th cycles, respectively.

DESCRIPTION

Figure 1:
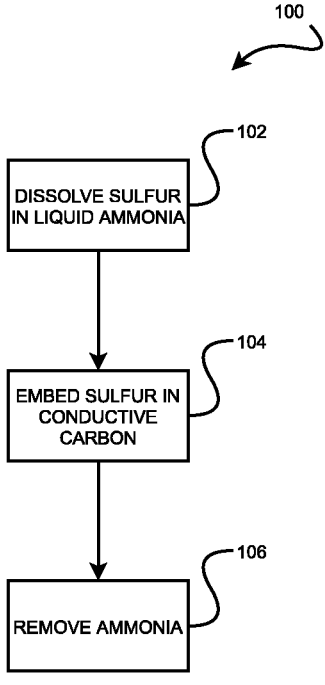
FIG. 1 is a flow diagram of an example embodiment of a method for embedding sulfur into conductive carbon.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used in this specification, the terms "about" or "approximately" mean a value within +/–10% of the stated value unless specified otherwise, and either one of these terms connotes that strict compliance with the numeric value recited is not critical but some variation is permissible and still within the scope of the various embodiments described herein.

As used herein, the term "conductive" means electrically conductive.

As used herein, the term "conductive carbon" means carbonaceous materials that allow the flow of electric current with little resistance. Conductive carbon has a level of conductivity (o) of at least 100 siemens per metre (S/m), including e.g. at least 150, at least 200, at least 250, at least 500, at least 750, at least 1000, at least 1250, at least 1500, at least 1750, at least 2000, at least 2500, at least 3000, at least 3500, at least 4000, at least 4500 or at least 5000 S/m. Some examples of conductive carbon are activated carbon, graphite, graphene, carbon nanotubes, and the like, or any desired mixture thereof. Any suitable source of biomass can be used to produce carbon that can be subjected to further chemical and/or thermal processing to yield activated carbon. For example, biomass such as coconut husk, lignin, or the like may be processed to produce biochar and/or hydrochar that can be further processed to yield activated carbon.

For example, for one form of activated carbon used in the examples described below (YPF), a conductivity of 1322 S/m is reported (N. Rey-Raap et. Al Measurement, An Electrical Conductivity Translator for Carbons, 2014, 56, 215-218). Those same authors report that graphite has a conductivity of 5023 S/m. Another source says that amorphous carbon (including activated carbon) has a conductivity of 1.25-2000 S/m while graphite has a conductivity of 2000-3300 S/m (Helmenstine, ThoughtCo. Table of Electrical Resistivity and Conductivity, 608499, 27 Jun. 2019). Fabiono reports activated carbon has a conductivity of 250-800 S/m (Fabiano Gomes Ferreira de Paula et. al., Structural Flexibility in Activated Carbon Materials Prepared under Harsh Activation Conditions, Materials 2019, 12, 1988). A. Barroso-Bogeat et. al., Electrical conductivity of activated carbon-metal oxide nanocomposites under compression: a comparison study, Phys. Chem. Chem. Phys., 2014, 16, 25161-25175 reported that typical activated carbon has >194 S/m using a compression at 750 kPa.

The inventors have found that liquid ammonia is an effective carrier to load sulfur into conductive carbon, for example to produce a sulfur electrode. Based on this, the inventors have invented a method and apparatus for embedding sulfur into conductive carbon. The sulfur-embedded conductive carbon may be used as a sulfur cathode of a metal-sulfur battery, e.g. a lithium-sulfur battery.

FIG. 1 shows an example embodiment of a method 100 for embedding sulfur into conductive carbon.

At step 102, sulfur, e.g. elemental sulfur, is dissolved in liquid ammonia ($NH_3$) to form a sulfur-ammonia solution. In some embodiments, the conditions at step 102 are selected to promote the solubility of sulfur in the liquid ammonia. In some embodiments, the liquid ammonia is anhydrous liquid ammonia.

At step 104, conductive carbon is soaked in the sulfur-ammonia solution to impregnate/embed the conductive carbon with sulfur. In some embodiments, the conductive carbon supplied at step 104 is activated carbon.

At step 106, liquid ammonia is removed. In some embodiments, liquid ammonia is removed as gaseous ammonia. For example, liquid ammonia may be exposed to open air and liquid ammonia then evaporates and is released as gaseous ammonia. Removal of ammonia yields the desired conductive carbon embedded with sulfur product.

Figure 2A:
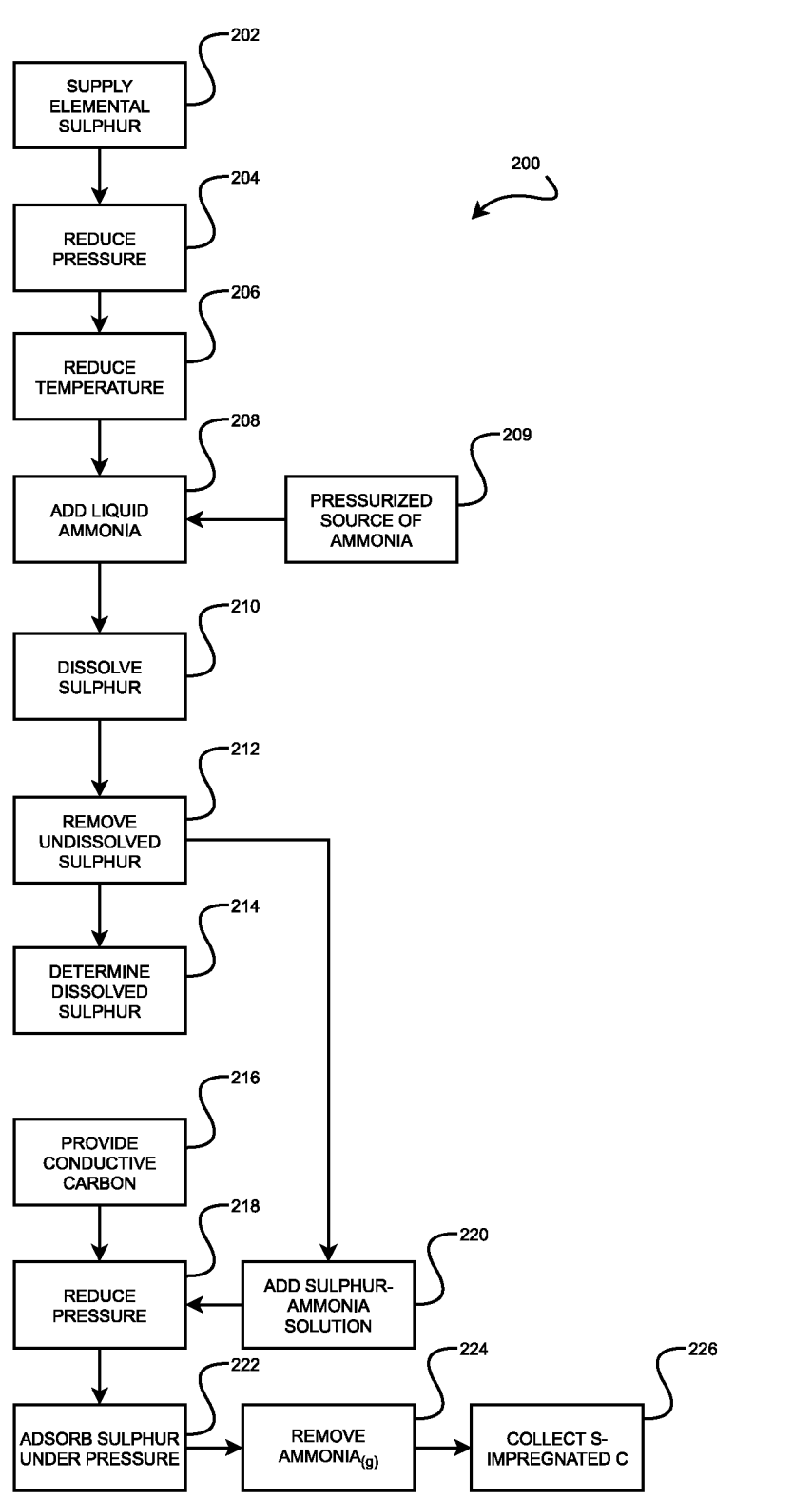
FIG. 2A is a flow diagram of a further example embodiment of a method for embedding sulfur into conductive carbon.

A further example embodiment of a process 200 for embedding sulfur in conductive carbon is illustrated in FIG. 2A.

At step 202, elemental sulfur is supplied to a suitable vessel. The elemental sulfur (S°) can be any form of sulfur, including crown-shaped $S_8$ molecules representative of the typical stable form of sulfur. Other forms of elemental sulfur include $S_6$, $S_7$, $S_9$, $S_{10}$, $S_{11}$, $S_{12}$, $S_{13}$, $S_{14}$, $S_{15}$, $S_{16}$, $S_{17}$, and $S_{18}$ rings, or linear or branched forms and are believed to also be soluble in liquid ammonia and are encompassed in various alternative embodiments. In some embodiments, the elemental sulfur is granular elemental sulfur (S°). In some embodiments, the elemental sulfur is powdered elemental sulfur. In some embodiments, granular elemental sulfur may be used to avoid potential difficulties in removing any undissolved fine powdery sulfur from the liquid ammonia solution in subsequent processing steps.

Any suitable reaction vessel can be used. In some embodiments, the reaction vessel is a pressure reactor. In some embodiments, the pressure reactor has a fine screen provided at its outlet, to facilitate separation of the resulting ammonia-sulfur solution from any undissolved sulfur. In some embodiments, the fine screen is made from an inert material such as stainless steel. In some embodiments, the screen has a mesh size that prevents particles having a diameter larger than about 25 μm from passing through the screen.

At step 204, the pressure in the vessel containing the elemental sulfur is reduced. In some embodiments, the pressure is reduced below atmospheric pressure at step 204. In some embodiments, step 204 is carried out under vacuum. In some embodiments, step 204 is carried out at close to zero psig. In some embodiments, the pressure level at step 204 is at least about 12 psi below an atmospheric pressure, including between about 12 psi and about 14 psi below an atmospheric pressure, including e.g. at least 12.5, 13.0, or 13.5 psi below an atmospheric pressure, or any pressure therebetween. In one example embodiment, the pressure during step 204 is reduced to approximately 12.2 psi below an atmospheric pressure. In some embodiments, a pressure feed such as a high pressure metering pump is used for carrying out step 208 to supply liquid ammonia described below, and in such embodiments step 204 can be omitted.

In some embodiments, at step 206 the temperature of the vessel containing the elemental sulfur is reduced below room temperature to increase sulfur solubility in the liquid ammonia. In some embodiments, the temperature at step 206 is between about −20° C. and about 20° C., including any value therebetween, e.g. −18° C., −16° C., −14° C., −12° C., −10° C., −8° C., −6° C., −4° C., −2° C., 0° C., 2° C., 4° C., 6° C., 8° C., 10° C., 12° C., 14° C., 16° C. and 18° C. In some embodiments, step 210 is conducted at the temperature that is set at step 206.

As an example, the solubility of sulfur is approximately 38% (by mass) at −20° C. at 27.6 psig of vapor pressure but decreases as temperature increases, as shown in Table 1 below. Unlike other liquids such as carbon disulfide, the solubility of sulfur decreases with increasing temperature in liquid ammonia. In some embodiments, based on the data as set forth in Table 1, the solubility of sulfur (% by mass) in liquid ammonia can be predicted by Equation (1), where T is the temperature in ° C. ($R^2=0.9816$):

$$\text{Solubility}=-0.344T+32.41 \tag{1}$$

In some embodiments, based on empirically determined data as set forth in Table 1, the vapor pressure of liquid ammonia can be predicted by Equation (2) ($R^2=0.9997$):

$$\text{Vapor Pressure}=0.0397T^2+2.4449T+46.321 \tag{2}$$

TABLE 1

| Solubility of sulfur in liquid ammonia (% by mass) at various temperatures. | | | |
|---|---|---|---|
| Temperature (° C.) | Sulfur solubility (% by mass) in $LNH_3$ | $LNH_3$ vapor pressure (psig)[1] | $LNH_3$ vapor pressure (kPa) |
| 35 | 19.65 | 181.1 | 1350 |
| 20 | 25.77 | 109.6 | 857.1 |
| 0 | 33.90 | 47.6 | 429.4 |
| −20 | 38.28 | 12.9 | 190.2 |

[1]See https://en.wikipedia.org/wiki/Ammonia_(data_page).

At step 208, liquid ammonia is added to the vessel containing the elemental sulfur. In some embodiments, the liquid ammonia is supplied from a pressurized reservoir of ammonia at 209. In some embodiments, the pressurized reservoir of ammonia at 209 is maintained in the range of about 110 to about 135 psig at room temperature, including any value therebetween, e.g. 115, 120, 125, or 130 psig. In one example embodiment, the pressurized reservoir of ammonia 209 is maintained at a pressure in the range of about 110 to about 132 psig at room temperature. Without being bound, it is believed that the pressure in reservoir 209 is determined primarily by the vapor pressure of the liquid ammonia contained therein, which varies with temperature. Thus, the pressure at which step 210 following step 209 is conducted can be the partial pressure of ammonia at the temperature at which step 210 is conducted. The pressure of the pressurized environment can vary depending on the vapor pressure of ammonia at the selected temperature, e.g. the pressure of the pressurized environment can be between 45 and 55 psig if the temperature is approximate 0° C., or between 10 and 50 psig if the temperature is approximately −20° C.

In some embodiments, the pressure differential between the vessel containing the elemental sulfur and the pressurized reservoir of ammonia drives the flow of liquid ammonia into the vessel containing the elemental sulfur. In some embodiments, a pump such as a high pressure metering pump is used at step 208 to deliver liquid ammonia to the vessel containing the elemental sulfur. Without being bound, use of such a pump may enhance the solubility of sulfur in the liquid ammonia as a higher transfer efficiency of liquid versus gaseous ammonia can be achieved.

At step 210, the elemental sulfur is dissolved in the liquid ammonia to provide a sulfur-ammonia solution. Any suitable method of dissolution may be used, for example the sulfur-ammonia solution may be shaken or stirred to encourage the solubilization process of sulfur, sonication may be used, or a metal stirrer may be used. In some embodiments, the sulfur-ammonia solution is shaken, stirred and/or sonicated for a period of time, e.g. in the range of about 5 to about 20 minutes, including any period therebetween e.g. 10 or 15 minutes.

Without being bound by theory, various ionic forms of sulfur such as $S_3$, $S_3N^-$, and $S_4N^-$ may exist in liquid ammonia. It is believed that once the solution is depressurized, e.g. at step 224 as described below with reference to this example embodiment, the liquid ammonia will self-vaporize and these sulfur species will be returned to their elemental forms.

At step 212, any undissolved sulfur may be removed from the sulfur-ammonia solution. In some embodiments, at step 212 the sulfur-ammonia solution is transferred to a second vessel without transferring any undissolved solid sulfur to remove the sulfur-ammonia solution from the undissolved sulfur. In some embodiments, a high-pressure pump can be used to transfer the sulfur-ammonia solution. In some embodiments in which the first vessel is a pressure reactor with a screen provided at its outlet, the screen is used to allow the sulfur-ammonia solution to flow through while retaining any undissolved sulfur.

In some embodiments, at step 214, the total amount of dissolved sulfur in the second vessel can be calculated using the gravimetric change of the first vessel relative to the second vessel. This calculation can allow for the determination of the amount of conductive carbon that can be impregnated with the dissolved sulfur.

In some embodiments, the percentage of dissolved sulfur in the sulfur-ammonia solution obtained at step 212 by weight is between about 5% and about 30%, including any value therebetween, e.g. 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28% or 29% w/w.

The desired amount of conductive carbon is subsequently soaked in the sulfur-ammonia solution to impregnate/embed the conductive carbon with sulfur. In some embodiments, the desired amount of conductive carbon is directly combined with the sulfur-ammonia solution.

In the illustrated embodiment, at step 216, the desired amount of conductive carbon is supplied in a third vessel provided. In some embodiments, the third vessel is provided with a stainless steel mesh with a mesh opening size of about 25 μm at its opening, for example to capture and retain activated carbon which might otherwise drift away by reason of air currents.

At step 218, the pressure in the vessel containing the conductive carbon is reduced under vacuum. In some embodiments, the pressure level at step 218 is reduced to at least about 12 psi below an atmospheric pressure, including between about 12 psi and about 14 psi below an atmospheric pressure, including e.g. at least 12.0, 12.5, 13.0, or 13.5 psi below an atmospheric pressure, or any pressure therebetween. In one example embodiment, the pressure level at step 218 is reduced to about 12.2 psi below the atmospheric pressure. In alternative embodiments, a pump such as a high pressure metering pump can be used to transfer the sulfur-ammonia solution at step 218 rather than reducing the pressure. In such embodiments, the pressure accordingly is not reduced at step 218.

At step 220, the sulfur-ammonia solution is supplied to the vessel containing the conductive carbon. Introduction of the sulfur-ammonia solution increases the pressure within the vessel containing the conductive carbon. In some embodiments, introduction of the sulfur-ammonia solution increases pressure in the vessel to in the range of about 110 to about 150 psig at room temperature, including any value therebetween, e.g. 115, 120, 125, 130, 135, 140 or 145 psig. In one example embodiment, the pressure at step 220 increases to in the range of about 126 to about 147 psig at room temperature. In some embodiments, step 220 is conducted at ambient or room temperature.

At step 222, sulfur from the sulfur-ammonia solution is adsorbed onto the conductive carbon under pressure to maintain the ammonia substantially in liquid form. In some embodiments, adsorption is carried out for an adsorption period. Any suitable length of time may be used for the adsorption period. In some embodiments, the adsorption period is between about 30 seconds and about 10 minutes, including any value therebetween, e.g. 45 seconds, 1 minute, 1.5, 2, 3, 4, 5, 6, 7, 8 or 9 minutes. Longer adsorption periods could be used if desired.

At step 224, ammonia is removed as gaseous ammonia by reducing the pressure in the vessel. In some embodiments, a needle valve is provided in fluid communication with the vessel to allow the pressure to be reduced.

In some embodiments, the output of fluid passing through a needle valve provided at the bottom of the vessel is supplied to a receiver vessel containing a suitable liquid such as water, so that bubble flow can be monitored as an indicator of gaseous ammonia flow exiting the receiver vessel. This is referred to as a blow-down or wet collection method, and drying of the resultant sulfur-impregnated activated carbon is subsequently required prior to its use.

In some embodiments, the ammonia vapor in the vessel is released by slowly opening a needle valve located at the top of the vessel, leaving the sulfur-impregnated carbon within the vessel for subsequent collection at step 226 as described below. This is referred to as a blow-up or dry collection method, and the sulfur-impregnated activated carbon obtained by this method does not require drying prior to collection or use.

If desired, the gaseous ammonia obtained from step 224 can be recovered for subsequent re-use in the process by using a compressor to compress the recovered gaseous ammonia back to liquid ammonia.

At step 226, the sulfur-impregnated conductive carbon is collected, for example by removal from the bottom of the vessel. In some embodiments, the vessel is a pressure reactor.

Figure 2B:
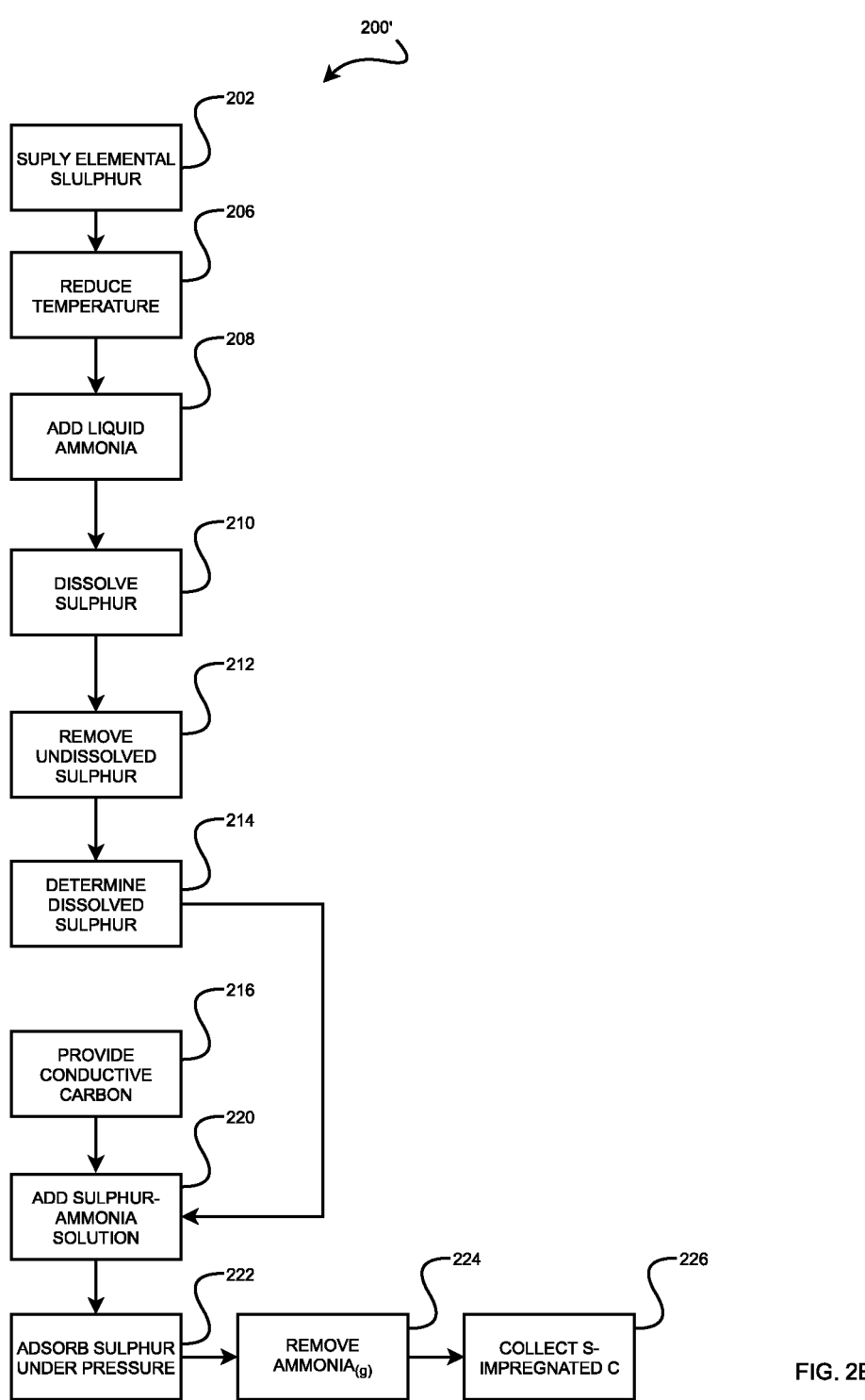
FIG. 2B is a flow diagram of a further example embodiment of a method for embedding sulfur into conductive carbon.

With reference to FIG. 2B, an alternative embodiment of a method 200' is illustrated. Method 200' is generally similar to method 200, and like steps are illustrated with the same reference numerals and are not further described herein. Method 200' differs from method 200 in that a pump such as a high pressure metering pump can be used to move the liquid ammonia or ammonia-sulfur solution rather than a vacuum source. Thus, step 204 is omitted, and liquid ammonia is supplied by the pump at step 208. Similarly, step 218 is omitted and sulfur-ammonia solution is supplied directly by the pump at step 220.

In some embodiments, the sulfur-impregnated conductive carbon collected at step 226 is further processed to manufacture electrodes, for example to provide sulfur cathodes for use in metal-sulfur batteries, e.g. lithium-sulfur batteries.

In some embodiments, the amount of conductive carbon used to absorb dissolved sulfur can be about 20% to about 100% of the weight of dissolved sulfur, including any value therebetween, e.g. 45, 50, 55, 60, 65, 70, 75, 80, 85, 90 or 95% w/w. Any desired value can be used in alternative embodiments. The final sulfur content (wt. %) in the sulfur-impregnated activated carbon can be in the range of about 30% to about 85%, including any value therebetween, e.g. 35, 40, 45, 50, 55, 60, 65, 70, 75 or 80% w/w.

Figure 3:
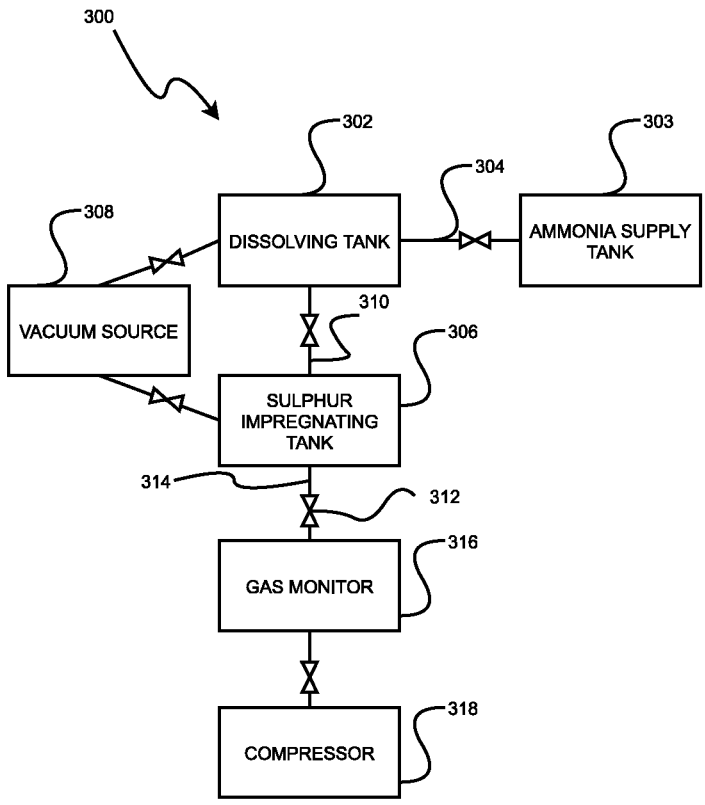
FIG. 3 is a schematic diagram of an example apparatus for embedding sulfur into conductive carbon.

Method 200 may be carried out in apparatus 300 for embedding conductive carbon with sulfur. With reference to FIG. 3, apparatus 300 has a sulfur dissolving tank 302. In some embodiments, sulfur dissolving tank 302 is a pressure reactor.

Sulfur dissolving tank 302 is provided with suitable conduits and valves to permit the steps of method 200 to be carried out. Liquid ammonia may enter into sulfur dissolving tank 302 from a pressurized ammonia supply tank 303 through a conduit 304.

In some embodiments, a stirrer [not shown] may be provided in sulfur dissolving tank 302 to mix the sulfur and liquid ammonia to encourage the solubilization process of the sulfur. In some embodiments, sulfur dissolving tank 302 can be uncoupled from apparatus 300 so that sulfur dissolving tank 302 can be subjected to vigorous shaking, whether by hand or by using any suitable shaking apparatus, to dissolve the sulfur in the liquid ammonia. In alternative embodiments, any suitable method such as sonication, a metal stirrer or the like may be provided to assist with dissolving sulfur in sulfur dissolving tank 302.

Apparatus 300 has a sulfur impregnating tank 306. Sulfur dissolving tank 302 and sulfur impregnating tank 306 are in selective fluid communication with each other. In some embodiments, sulfur dissolving tank 302 and sulfur impregnating tank 306 are connected by a pipe 310. A suitable valve can be provided in pipe 310 to maintain the respective pressures within sulfur dissolving tank 302 and sulfur impregnating tank 306 and to control the flow of fluids therebetween.

A suitable vacuum source 308 is provided to help provide negative pressure within dissolving tank 302 and sulfur impregnating tank 306 when desired. Although a single vacuum source 308 has been shown in the illustrated embodiment, two separate vacuum sources and/or high-pressure metering pumps could be provided in alternative embodiments.

In some embodiments, a predetermined amount of conductive carbon is loaded in sulfur impregnating tank 306, and the pressure in sulfur impregnating tank 306 is then reduced by placing sulfur impregnating tank 306 under vacuum. The solution of liquid ammonia and dissolved sulfur from sulfur dissolving tank 302 can then flow into sulfur impregnating tank 306, which will result in sulfur impregnating tank 306 becoming pressurized, allowing the dissolved sulfur to be embedded into the conductive carbon in sulfur impregnating tank 306.

Sulfur impregnating tank 306 has a release valve 312 to depressurize sulfur impregnating tank 306. Once sulfur impregnating tank 306 is depressurized, liquid ammonia evaporates as gaseous ammonia and then exits from sulfur impregnating tank 306 via an exiting pipe 314. In some embodiments, release valve 312 is located more proximate to an upper end than a lower end of impregnating tank 306; the illustrated view is schematic in nature only.

In some embodiments, a gas monitor 316 is provided to monitor the release of gaseous ammonia from sulfur impregnating tank 306. In some embodiments, gas monitor 316 is a reservoir filled with suitable liquid, such as water, so that the release of ammonia from sulfur impregnating tank 306 can be monitored.

In some embodiments, sulfur-embedded conductive carbon can be collected from a lower end of sulfur impregnating tank 306 once most or all of the ammonia has been released from sulfur impregnating tank 306 and optionally dried. Sulfur-embedded conductive carbon may be used as a sulfur cathode material for use in the manufacture of a metal-sulfur battery, such as a Li—S battery.

In some embodiments, a battery containing such a sulfur-embedded conductive carbon may be cycled through charge and discharge cycles extending only to about 75% depth-of-discharge (DoD), to help prevent the formation of insoluble polysulfides, thereby prolonging the life of the battery. In some embodiments, a battery containing such a sulfur-embedded conductive carbon contains an electrolyte in a volume of between about 30 to about 80 μL/mg of sulfur, including any range or subrange therebetween, e.g. 35, 40 45, 50, 55, 60, 65, 70 or 75 μL/mg of sulfur, to help minimize the formation of insoluble polysulfides.

In some embodiments, ammonia can be collected and fed to a compressor 318 so that it can be recompressed to liquid ammonia for use again in the process conducted by apparatus 300.

Figure 4:
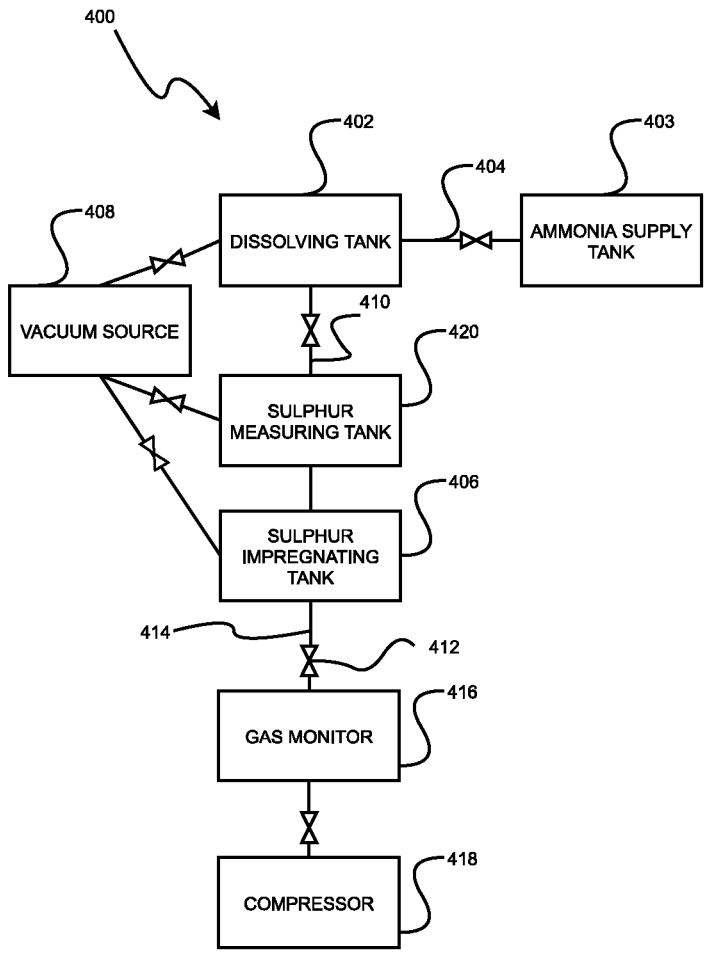
FIG. 4 is a schematic diagram of an example apparatus for embedding sulfur into conductive carbon using a sulfur measuring tank.

A further example embodiment of an apparatus 400 for embedding conductive carbon with sulfur is illustrated in FIG. 4. Components of apparatus 400 that are similar to apparatus 300 are illustrated with reference numerals incremented by 100 and are not further described herein (i.e. sulfur dissolving tank 402, ammonia supply tank 403, conduit 404, sulfur impregnating tank 406, vacuum source 408, pipe 410, release valve 412, exiting pipe 414, gas monitor 416 and compressor 418).

Apparatus 400 differs from apparatus 300 in that a sulfur measuring tank 420 is provided downstream of sulfur dissolving tank 402. After sulfur has been dissolved in liquid ammonia in sulfur dissolving tank 402, sulfur measuring tank 420 is placed under vacuum to draw the sulfur-ammonia solution into the interior thereof, while undissolved sulfur is retained in dissolving tank 402, for example by positioning a suitable screen over the outlet of dissolving tank 402. The total amount of dissolved sulfur present in sulfur measuring tank 420 is then calculated based on the gravimetric difference between tanks 402 and 420 to calculate the amount of conductive carbon to be placed in sulfur impregnating tank 406 prior to addition of the sulfur-ammonia solution from sulfur measuring tank 420.

Figure 5:
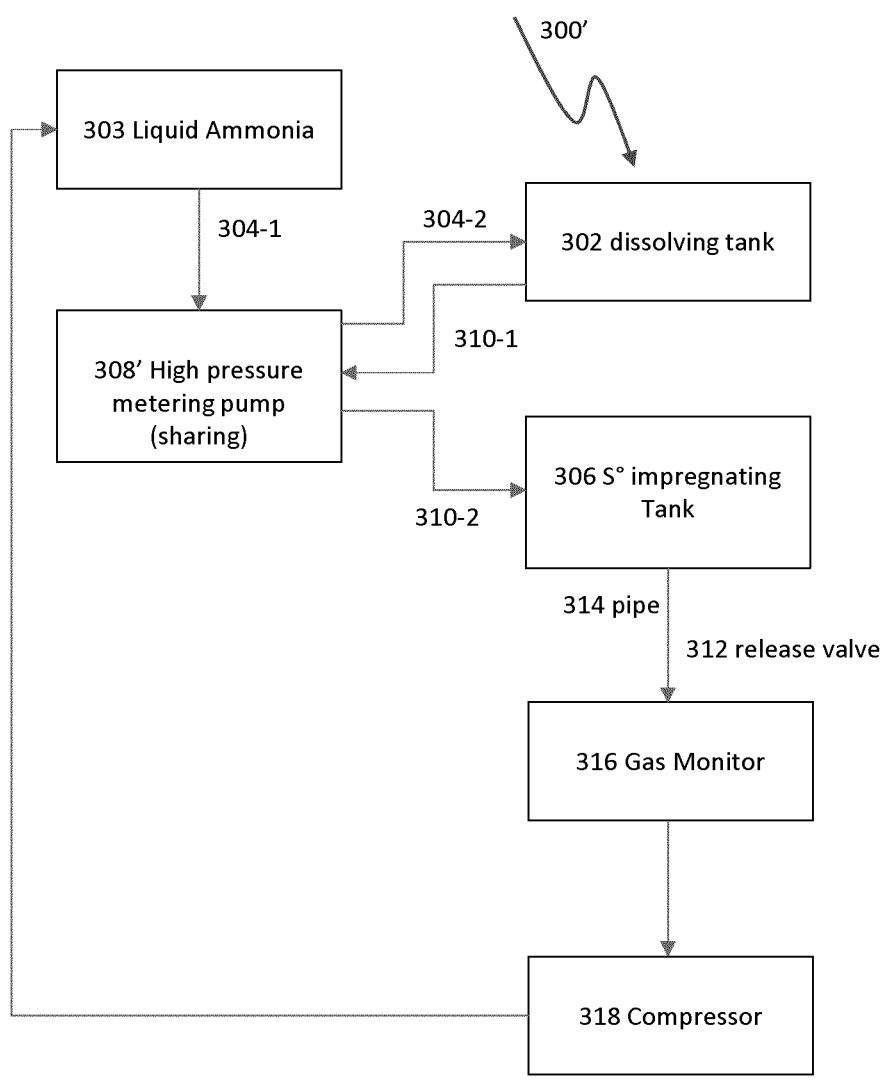
FIG. 5 is a schematic diagram of an example apparatus for embedding sulfur into conductive carbon using a high pressure metering pump.

A further alternative example embodiment of an apparatus 300' for embedding conductive carbon with sulfur is illustrated in FIG. 5. Apparatus 300' is generally similar to apparatus 300, and like components are illustrated with the same reference numeral and are not further described herein. Apparatus 300' differs from apparatus 300 in that liquid ammonia is supplied from a liquid ammonia supply tank 303 to a high pressure metering pump 308' that is used to supply both ammonia and ammonia-sulfur solution, rather than using a vacuum to depressurize the receiving containers. High pressure metering pump 308' receives liquid ammonia from tank 303 via line 304-1, and supplies liquid ammonia to dissolving tank 302 via line 304-2. The sulfur-ammonia solution is then fed back to high pressure metering pump 308' via line 310-1, and to sulfur impregnating tank 306 via line 310-2. Liquid ammonia can be compressed via compressor 318 and then fed back to liquid ammonia supply tank 303. While a single high pressure metering pump 308' is illustrated, in alternative embodiments separate high pressure metering pumps could be provided to facilitate the necessary fluid flow within apparatus 300'.

Figure 6:
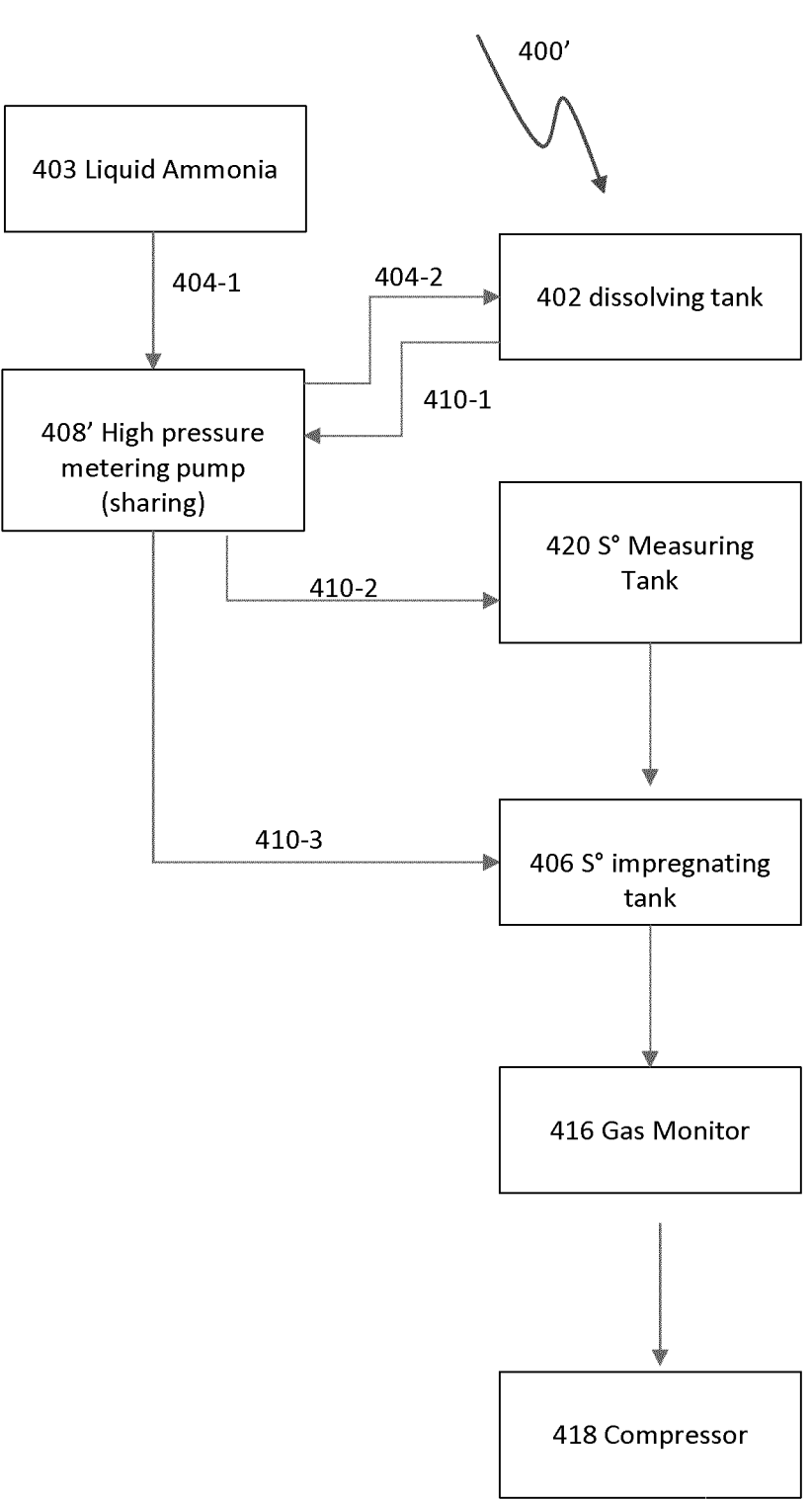
FIG. 6 is a schematic diagram of an example apparatus for embedding sulfur into conductive carbon using a high pressure metering pump and a sulfur measuring tank.

A further alternative example embodiment of an apparatus 400' for embedding conductive carbon with sulfur is illustrated in FIG. 6. Apparatus 400' is generally similar to apparatus 400, and like components are illustrated with the same reference numeral and are not further described herein. Apparatus 400' differs from apparatus 400 in that liquid ammonia is supplied from a liquid ammonia supply tank 403 to a high pressure metering pump 408' that is used to supply both ammonia and ammonia-sulfur solution. High pressure metering pump 408' receives liquid ammonia from tank 403 via line 404-1, and supplies liquid ammonia to dissolving tank 402 via line 404-2. The sulfur-ammonia solution is then fed back to high pressure metering pump 408' via line 410-1, then to sulfur measuring tank 420 via line 410-2, and to sulfur impregnating tank 406 via line 410-3 (or directly if desired). While a single high pressure metering pump 408' is illustrated, in alternative embodiments separate high pressure metering pumps could be provided to facilitate the necessary fluid flow within apparatus 400'.

EXAMPLES

Further embodiments are more specifically described with reference to the following examples, which are intended to be illustrative and not limiting in nature.

Example 1—Activated Carbon

Example 1 was conducted at room temperature. Granular elemental sulfur was loaded in a sulfur dissolving tank that is a pressure reactor. The sulfur dissolving tank has a fine stainless-steel screen with a sieve size of approximately 25 μm. The screen was placed at the bottom of the sulfur dissolving tank. Once the sulfur was loaded, the sulfur dissolving tank was placed under vacuum to reduce the pressure to lower than about 12.2 psi below atmospheric pressure. Alternatively, if a high-pressure metering pump is available, the high-pressure metering pump can be used rather than vacuum.

Liquid ammonia was transferred from a liquid ammonia reservoir to the sulfur dissolving tank by pressure difference between the liquid ammonia reservoir (about 110 psig at room temperature) and the sulfur dissolving tank.

Sulfur was dissolved in the liquid ammonia to form a sulfur-ammonia solution in the sulfur dissolving tank. The sulfur dissolving tank was shaken for about 10 minutes after being disconnected from the liquid ammonia reservoir to dissolve the sulfur.

A second pressure reactor was placed under vacuum to reduce the pressure to less than about 12.2 psi below atmospheric pressure. The sulfur-ammonia solution was drained from the sulfur dissolving tank into the second pressure reactor. The undissolved solid sulfur was retained in the sulfur dissolving tank by the screen placed at the bottom of the sulfur dissolving tank, while the liquid sulfur-ammonia solution was permitted to exit to the second pressure reactor, to separate undissolved sulfur from the desired sulfur-ammonia solution.

The amount of dissolved sulfur was calculated using gravimetric changes between the sulfur dissolving tank and the second pressure reactor.

A specific amount of activated carbon was weighed based on the amount of dissolved sulfur as shown in Table 2.

The specific amount of activated carbon was loaded into a sulfur impregnating tank and the sulfur impregnating tank was then placed under vacuum to reduce the pressure to less than about 12.2 psi below atmospheric pressure.

The sulfur-ammonia solution was transferred from the second pressure reactor to the sulfur impregnating tank. The dissolved sulfur is absorbed onto the activated carbon for about 1 minute at a pressure of about 110 psig.

The sulfur impregnating tank was then depressurized and gaseous ammonia was released from the sulfur impregnating tank through a needle valve. Exit of the gaseous ammonia through the needle valve was monitored by allowing the gas to bubble through a beaker filled with water.

The sulfur-impregnated activated carbon was collected from the bottom of the sulfurimpregnating tank. The recovered sulfur-impregnated activated carbon can be used as a cathode material, for example for the preparation of lithium sulfur batteries.

As shown in Table 2 below, the sulfur content in the sulfur-impregnated activated carbon ranged from 48% to 67%.

TABLE 2

| | | Trial | | | | | |
|---|---|---|---|---|---|---|---|
| | | Sulphur content in tested examples. | | | | | |
| Step | Description | #1 | #2 | #3 | #4 | #5 | #6 |
| 202 | S° (g) added for the preparation of LNH3-S° solution (Vessel R1) | 5.0 | 5.0 | 5.0 | 4.9 | 5.0 | 5.0 |

TABLE 2-continued

| | Sulphur content in tested examples. | | | | | | |
|---|---|---|---|---|---|---|---|
| 208 | LNH$_3$ (g) to dissolve S° in R1 | 17.7 | 23.5 | 25.1 | 28.7 | 18.3 | 20.7 |
| 210 | Dissolved S° (g) in R1 vessel | 3.6 | 2.0 | 3.7 | 2.7 | 4.9 | 2.2 |
| 212 | Mass (g) of LNHs + °S° solution in R1 after undissolved S° removal | 21.3 | 25.5 | 28.8 | 31.4 | 23.2 | 22.9 |
| 210, 212 | S (%) dissolved in the LHN$_3$-S° solution in R1 (after undissolved S° removal) | 16.9% | 7.8% | 12.8% | 8.6% | 21.1% | 9.6% |
| 214 | Undissolved S° (g) in R1 | 1.4 | 3.0 | 1.3 | 2.2 | 0.1 | 2.8 |
| 212 → 220 (The LNH$_3$-S° solution transferred from R1 to R2) | Mass (g) of LNH$_3$-S° solution after undissolved S° removal and transfer(to R2 vessel which is 220) | 16.9 | 22.6 | 23.8 | 27.5 | 18.0 | 20.4 |
| 212 → 220 Loss during the transfer stage from R1 (212) to R2(220) | Mass loss (g) of the NH$_3$-S° solution after transfer from 212 to 220 | 4.4 | 2.9 | 5.0 | 3.9 | 5.2 | 2.5 |
| | Transfer eff. (%) of the LNH$_3$-S° solution from R1 (212) to Vessel R2 (220) | 79.3% | 88.6% | 82.6% | 87.6% | 77.6% | 89.1% |
| 220 | Dissolved S° (g) in in the LNH$_3$-S° solution in R2 | 2.86 | 1.77 | 3.06 | 2.36 | 3.80 | 1.96 |
| 222 | Amount (g) of the LNH$_3$-S° solution and AC in Vessel R3 (which is 222) | 11.2 | 13.2 | 9.2 | 15.1 | 12.5 | 12.9 |
| 220 → 218 Loss during the transfer stage from 220 (R2 to R3 vessel) | Mass loss (g) of the NH$_3$-S° solution after transfer from R2 (220) to R3 (218) | 5.7 | 9.4 | 14.6 | 12.4 | 5.5 | 7.5 |
| | Mass loss (g) of S° in R2 (220) after transfer from R2 (220) to R3 (218) | 1.0 | 0.7 | 1.9 | 1.1 | 1.2 | 0.7 |
| 212 → 220 | Transfer eff. (%) of the LNH$_3$-S° solution from R2 to R3 | 66.3% | 58.4% | 38.7% | 54.9% | 69.4% | 63.2% |
| 216 | Type of Carbon | CAC (Commercial AC) | ABC1 Produced by inventors | ABC1 | CAC-T | CBC-T-2 | CBC-T-1 |
| 216 | Amount (g) of AC used | 1.73 | 0.63 | 1.05 | 1.10 | 1.40 | 0.90 |
| 222 | Amount (g) of the LNH$_3$-S° solution and AC in R3 (which is 222) | 9.6 | 11.9 | 7.9 | 14.6 | 12.4 | 12.5 |
| 222 | Total mass of LNH$_3$ and S°-impregnated AC under pressure | 11.3 | 12.5 | 8.9 | 15.7 | 13.8 | 13.4 |
| 222 (S° absorbed in AC) | S° (g) absorbed in AC | 1.6 | 0.9 | 1.0 | 1.3 | 2.6 | 1.2 |
| 226 | Mass (g) of S° impregnated AC in 226 (vessel) | 3.4 | 1.6 | 2.1 | 2.4 | 4.0 | 2.1 |
| 226 (resultant S°-AC) | Sulfur content (%) in S°-impregnated AC | 48.25% | 59.5% | 49.1% | 53.3% | 65.2% | 57.2% |

| | | Trial | | | | | |
|---|---|---|---|---|---|---|---|
| Step | Description | #7 | #8 | #8 | #10 | #11 | #12 |
| 202 | S° (g) added for the preparation of LNH$_3$-S° solution (Vessel R1) | 5.1 | 5.0 | 4.9 | 5.0 | 4.9 | 5.0 |
| 208 | LNH$_3$ (g) to dissolve S° in R1 | 20.6 | 19.5 | 23.0 | 19.0 | 21.0 | 13.8 |

TABLE 2-continued

| | Sulphur content in tested examples. | | | | | | |
|---|---|---|---|---|---|---|---|
| 210 | Dissolved S° (g) in R1 vessel | 2.7 | 2.4 | 2.9 | 2.3 | 1.9 | 2.1 |
| 212 | Mass (g) of LNH₃ + °S° solution in R1 after undissolved S° removal | 23.3 | 21.9 | 25.9 | 21.3 | 22.9 | 15.9 |
| 210, 212 | S (%) dissolved in the LHN₃-S° solution in R1 (after undissolved S° removal) | 11.6% | 11.0% | 11.2% | 10.7% | 8.3% | 13.2% |
| 214 | Undissolved S° (g) in R1 | 2.4 | 2.6 | 2.0 | 2.7 | 3.0 | 2.9 |
| 212 → 220 (The LNH3-S° solution transferred from R1 to R2) | Mass (g) of LNH₃-S° solution after undissolved S° removal and transfer(to R2 vessel which is 220) | 20.3 | 19.3 | 20.8 | 18.9 | 19.8 | 13.4 |
| 212 → 220 Loss during the transfer stage from R1 (212) to R2(220) | Mass loss (g) of the LNH₃-S° solution after transfer from 212 to 220 | 3.0 | 2.6 | 5.1 | 2.4 | 3.1 | 2.5 |
| | Transfer eff. (%) of the LNH₃-S° solution from R1 (212) to Vessel R2 (220) | 87.1% | 88.1% | 80.3% | 88.8% | 86.5% | 84.3% |
| 220 | Dissolved S° (g) in in the LNH₃-S° solution in R2 | 2.35 | 2.12 | 2.33 | 2.02 | 1.64 | 1.77 |
| 222 | Amount (g) of the LNH₃-S° solution and AC in Vessel R3 (which is 222) | 15.1 | 14.3 | 16.3 | 14.6 | 13.9 | 12.2 |
| 220 → 218 Loss during the transfer stage from 220 (R2 to R3 vessel) | Mass loss (g) of the LNH₃-S° solution after transfer from R2 (220) to R3 (218) | 5.2 | 5.0 | 4.5 | 4.3 | 5.9 | 1.2 |
| | Mass loss (g) of S° in R2 (220) after transfer from R2 (220) to R3 (218) | 0.6 | 0.5 | 0.5 | 0.5 | 0.5 | 0.2 |
| 212 → 220 | Transfer eff. (%) of the LNH₃-S° solution from R2 to R3 | 74.4% | 74.1% | 78.4% | 77.2% | 70.2% | 91.0% |
| 216 | Type of Carbon | ABC1 | ABC 1-2 | ABC1-1 | AHC1 produced by inventors | AHC1-2 | AHC1-1 |
| 216 | Amount (g) of AC used | 0.90 | 0.90 | 1.10 | 1.00 | 0.90 | 0.80 |
| 222 | Amount (g) of the LNH₃-S° solution and AC in R3 (which is 222) | 14.9 | 14.1 | 15.2 | 14.2 | 13.7 | 12.2 |
| 222 | Total mass of LNH₃ and S°-impregnated AC under pressure | 15.8 | 15.0 | 16.3 | 15.2 | 14.6 | 13.0 |
| 222 (S° absorbed in AC) | S° (g) absorbed in AC | 1.7 | 1.5 | 1.7 | 1.5 | 1.1 | 1.6 |
| 226 | Mass (g) of S° impregnated AC in 226 (vessel) | 2.6 | 2.4 | 2.8 | 2.5 | 2.0 | 2.4 |
| 226 (resultant S°-AC) | Sulfur content (%) in S°-impregnated AC | 65.7% | 63.2% | 60.7% | 60.3% | 55.8% | 66.8% |

The various calculation steps are further summarized below:

Preparation of LNH3+°S Solution 1. (Step 202) The empty mass (M1) of R1 is recorded.

2. (Step 202) 5 g of S° is pre-charged in R1, The mass (M2) of R1+S° is recorded.

3. R1 is degassed (vacuumed) for the transfer of LNH₃.

4. LNH₃ is transferred. The mass (M3) of R1+S°+LNH₃ is recorded. In this step, R1 has LNH₃+S° solution (liquid) and an undissolved S° (solid).

5. The empty mass (M4) of R2 is recorded, and R2 is degassed for the transfer of the LNH₃+S° solution from R1.

6. The LNH₃+S° solution is transferred to R2 from R1. The mass (M5) of the R2+LNH₃+S° solution is recorded.

7. The mass (M6) of R1+LNH₃+S° solution+undissoved S° is recorded (the NH₃+S° solution is still left in R1). M6 is for the calculation of the transfer efficiency of the LNH₃+S° solution.

8. (Step 212) LNH₃+S° solution (the remaining solution) in R1 is discharged in a fumehood. The mass (M7) of R1+undissolved S° solution is recorded.

The determination of sulfur content in the LNH₃+°S solution.

The actual mass of S° added in R1=M2–M1 (the initial mass of solid S° in R1)

The mass of LNH₃ transferred in R1=M3–M2 (amount of LNH₃ in R1)

The mass of LNH₃+S° solution transferred to R2 from R1=M6–M5 (available mass of LNH₃+S° solution)

The mass of undissolved S° in R1=M7–M1 (the remaining mass of solid S° in R1)

The mass of dissolved S° in the LNH₃+°S solution=(M2–M1)–(M7–M1)

Sulfur content in the *LNH₃* + °S solution =

$$\frac{(M2 - M1) - (M7 - M1)}{(M2 - M1) - (M7 - M1) + (M3 - M2)}$$

Without being bound by theory, the inventors believe that if in this example metering high pressure pumps were used to transfer liquid ammonia and reactor temperature was lowered, the sulfur content in the sulfur-impregnated activated carbon may be higher. The transfer efficiency could be increased by using a high-pressure metering pump.

Example 2—Sulfur-Embedded Activated Carbon as a Sulfur Cathode

Table 3 shows the major chemical and adsorptive properties (iodine values and surface area) of bioactivated carbon and CAC (a commercially available activated carbon YP50F obtained from Calgon used as a control). The ABC1 (activated carbon produced by the inventors from lignin as a source of carbon biomass) had 97.1% carbon, 2,919 mg/g iodine value, 2,784 m²/g surface area, and 14.3 μm mean particle size, while CAC had 94.5% carbon, 1,796 mg/g iodine value, 1,731 m²/g surface area, and 5.4 μm mean particle size. Other experiments performed by the inventors confirmed that the benchmark activated commercial carbon used in these examples (CAC), YP50F from Calgon, has approximately 5-6 times higher resistance than graphite, while activated biocarbon produced by the inventors in house from lignin has approximately 2-2.5 times higher resistance than graphite.

TABLE 3

Chemical and adsorptive properties of carbon products used for sulfur impregnation.

| Carbon ID | Carbon content (%) | Ash content (%) | Iodine value (mg/g) | Surface area (m²/g) | Mean particle size (μm) |
|---|---|---|---|---|---|
| ABC1 produced by inventors | 97.10% | 0.54% | 2,919 | 2,784 | 14.3 |
| CAC | 94.50% | 0.35% | 1,796 | 1,731 | 5.4 |

Table 4 summarizes test results from LiS batteries prepared using S°-impregnated biocarbon-based cathodes. ABC1 (activated carbon produced from lignin by the inventors) was impregnated with elemental sulfur at 59.46% (denoted as ABC1+60% S) and 49.08% (denoted as ABC1+50% S), respectively. CAC (commercially available control activated carbon) was also impregnated with sulfur at 48.25% (denoted as CAC+50% S).

For the fabrication method for the cathode of the LiS battery, the S°-impregnated carbon product, polyvinyl fluoride (PVF as a binder), and graphite (as a conductivity enhancing agent, given the high sulfur content of the sulfur-impregnated carbon product which reduced its conductivity) were formed into a paste using N-Methyl-2-pyrrolidone (NMP). The mass ratio of this carbon-sulfur (C—S) composite was 60:20:20, respectively. These C—S composites were coated on aluminum foil and cathodes (15 mm in diameter) were prepared for the assembly of LiS batteries (CR 2032 type) in the Ar-filled glove box.

Four cells were assembled in each group. The electrolyte (containing 1 M of lithium bis(trifluoromethane sulfonyl) imide (LIN(SO₂CF₃)₂) and 1% lithium nitrate in 1,2-dimethoxyethane (DME) and 1,3-dioxolane (DOXL)) was added to each cell using an electrolyte volume per 1 mg of sulfur in the cathode ranging from 100 to 115 μL. Once all LiS batteries were assembled, the initial voltage of the button cell was measured. As presented below, all button cells showed an initial voltage (>2.3 V) with consistency except for one button cell in each of the ABC1+60% S and CAC+50% S groups. It was believed that the cathode and anode may have misaligned during assembly resulted in a direct connection which led to the malfunction of these particular LiS batteries.

TABLE 4

LiS batteries fabricated using S-impregnated activated biocarbon cathodes.

| Carbon type | Coin cell ID(#) | Voltage (V) |
|---|---|---|
| ABC1 + 60% S (S°-impregnated | S8-5 | 2.355 |
| ABC1 at sulfur | S8-6 | 0.000 |
| content of 59.46%) | S8-7 | 2.310 |
| | S8-8 | 2.370 |
| ABC1 + 50% S (S° impregnated | S9-9 | 2.384 |
| ABC1 at sulfur | S9-10 | 2.388 |
| content of 49.08% | S9-11 | 2.382 |
| | S9-12 | 2.419 |
| CAC + 50% S (S°-impregnated | S11-5 | 2.360 |
| CAC at sulfur | S11-6 | 2.397 |
| content of 48.25%) | S11-7 | 0.000 |
| | S11-8 | 2.397 |

Figure 7:
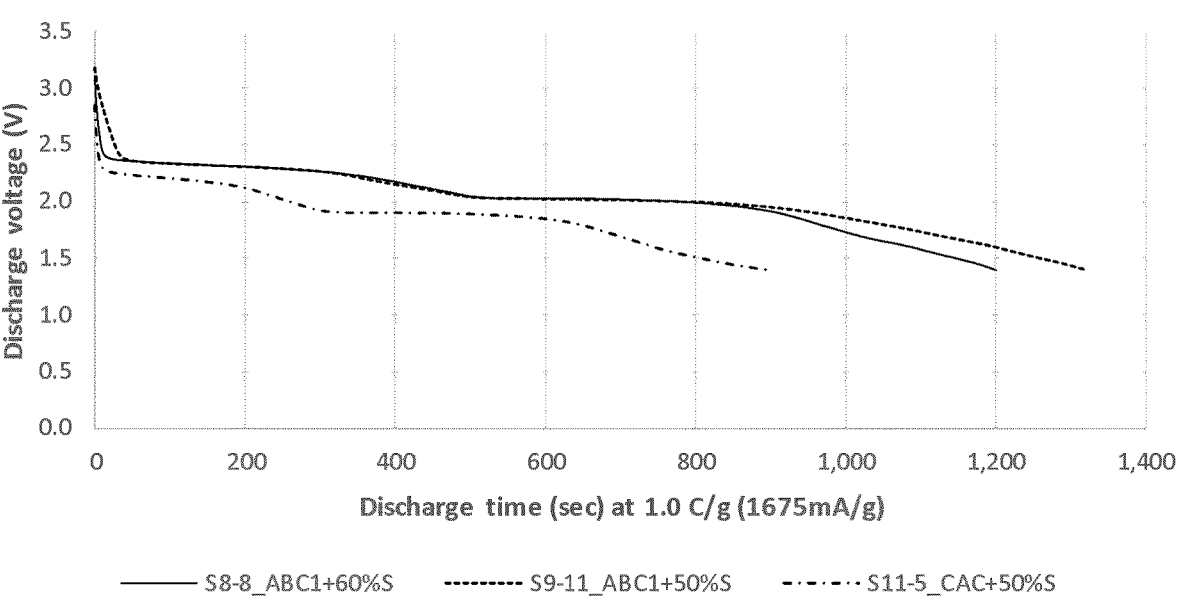
FIG. 7 shows the profile of the discharge curve from Galvano charge and discharge tests for three cells in one example.

FIG. 7 shows the profile of the discharge curve from GCD (Galvano charge and discharge) tests. A representative cell from each group (S8-8 for the ABC1+60% S group, S9-11 for the ABC1+50% S group and S11-5 for the CAC+50% S group) was discharged and charged in order 3 times at full voltage range (1.4 V to 3.3V). S8-8 (ABC1+60% S) and S9-11 (ABC1+50% S) achieved a capacity of 555.9 mA/g and 614.6 mAh/g respectively, at a current density of 1675 mA/g which is a fast discharge while S11-5 (CAC+50% S) performed at a capacity of 417.6 mAh/g at a current density of 1,675 mA/g. The discharge voltage in FIG. 7 shows a typical voltage profile of the LiS battery at a constant current that has 2 plateaux. The first plateau is ground at 2.3V. The elemental sulfur (S₈) is reduced to S₂²⁻ from the 1^st plateau to the end of the 2^nd plateau at 2.1V. The S₂²⁻ is further reduced to S²⁻ at the 2nd transition point. This voltage profile reflects that S₈ embedded in pores of the activated carbon products is broken down to S²⁻ through the serial reduction process when the LiS battery discharges.

Of these cells, S8-8 for the ABC1+60% S group, S9-11 for the ABC1+50% S group, and S11-5 for the CAC+50% S group were continuously cycled at the full voltage range.

Figure 8A:
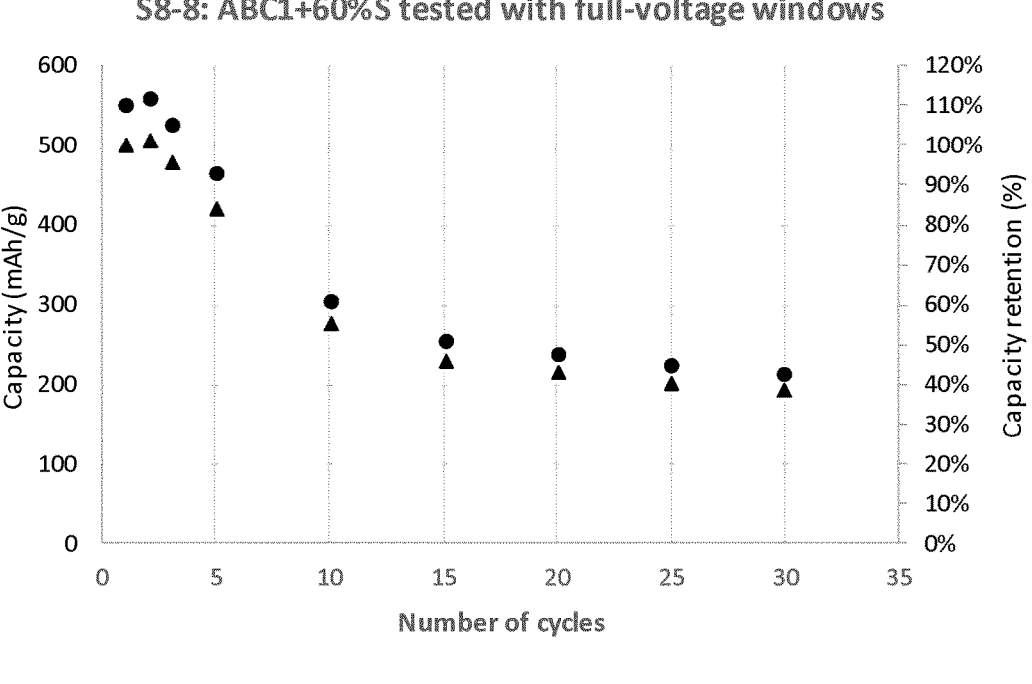
FIGS. 8A, 8B and 8C show the discharge capacity of various LiS battery cells performed for up to 30 charge-discharge cycles.
Figure 8B:
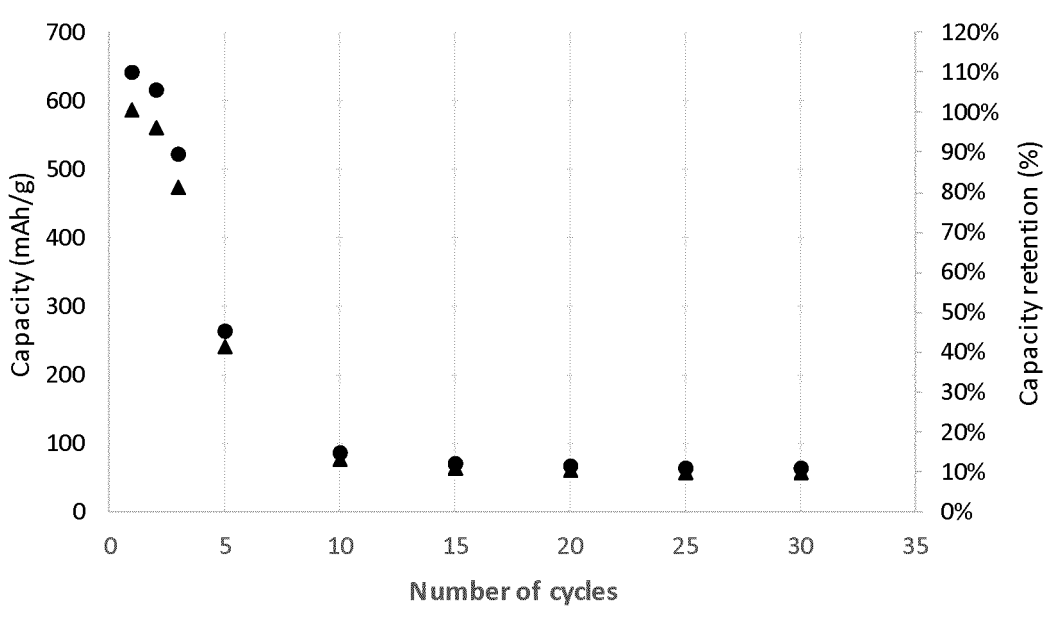
Figure 8C:
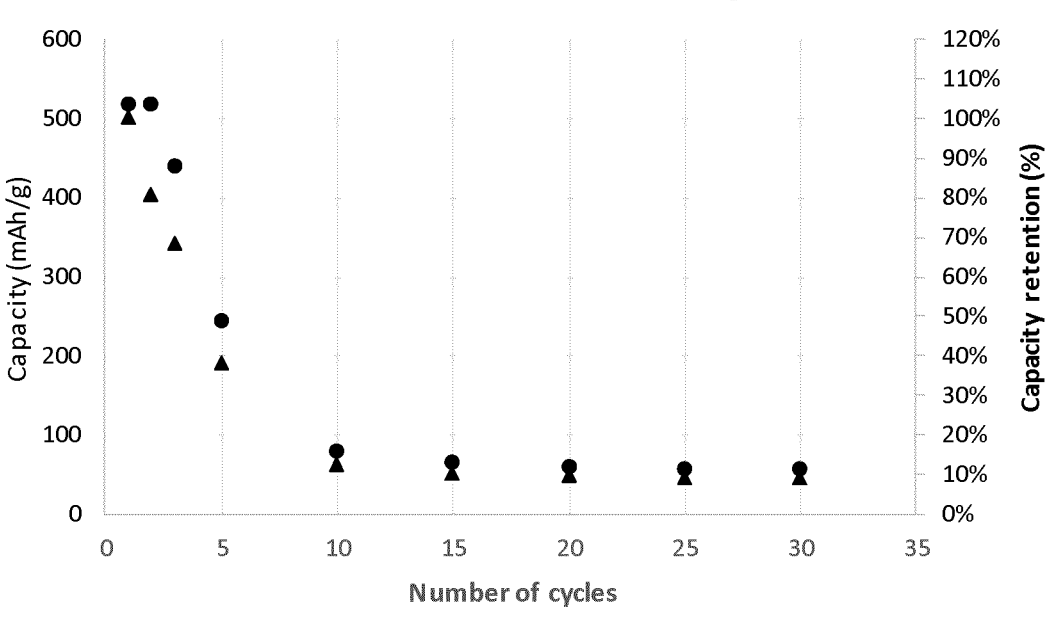

FIGS. 8A, 8B, and 8C shows discharge capacity (mAh/g) across 30 cycles of charge and discharge. All of these LiS batteries showed lower capacity retention percentages (39.5% for S8-8 (FIG. 8A), 9.7% for S9-11 (FIG. 8B), and 8.6% for S11-5 (FIG. 8C)).

Table 5 shows each reduction of sulfur from $S_8$ to $S_1$. One sulfur ion at each reduction point is able to react with 2 ions of Li ionized from the Li metal anode during the discharge. The completion of this whole serial reduction includes 1 mole of elemental sulfur ($S_8$) using 16 moles of elemental Li. The last two reduction steps create $Li_2S_2$ and $Li_2S$, which are insoluble in the electrolyte in the LiS battery system. These insoluble polysulfides eventually solidify on the surface of the Li anode. As a result, the availability of sulfur (as an active material impregnated in activated biocarbon) lessens and the Li anode can not be ionized because of the blockage by these insoluble polysulfides ($Li_2S_2$ and $Li_2S$). Existing literature (e.g. Nazar et al., 2014, Lithium-sulfur batteries, MRS Bulletin, vol. 39; Lin and Liang, 2015, J. Materials Chemistry A, 3:919-1346; and Fotouhi, et al., 2017, Energies, 10:1937) reveals the fundamental chemistry issues in the LiS battery system.

In this study, LiS batteries were tested in a manner designed to avoid this insoluble polysulfide formation on the Li anode by using an adjusted voltage range from 3.0V to 1.96V, which is called the soluble voltage or 75% Depth of Discharge (DoD). Theoretically, 16 electrons are available at the full voltage range, while 12 electrons are available within the soluble voltage range. This means that the full capacitance will be 25% reduced within the soluble voltage range.

(97.97% at the 100th cycle). This high capacity retention (to 217 cycles) indicates that the formation of insoluble polysulfides was minimized by keeping the discharge within the soluble voltage range.

For the first ten cycles, capacity and retaining percentage were not stable because of an unpredictable power-cut from the test facility. For cycles 11-20, an average capacity of 377.3 mAh/g at a current density of 1675 mA/g (1.0 C/g) was maintained. For cycles 21-42, capacity and retaining percentage were not stable because of several unpredictable power-cuts from the test facility. For cycles 42-217, an average capacity of 422.5 mAh/g at a current density of 838 mA/g (0.5 C/g, used for most practical applications) was maintained. At the $217^{th}$ cycle, capacity was 404.8 mAh/g and capacity retained was 97.97%.

Figures 11, 12A, 12B:
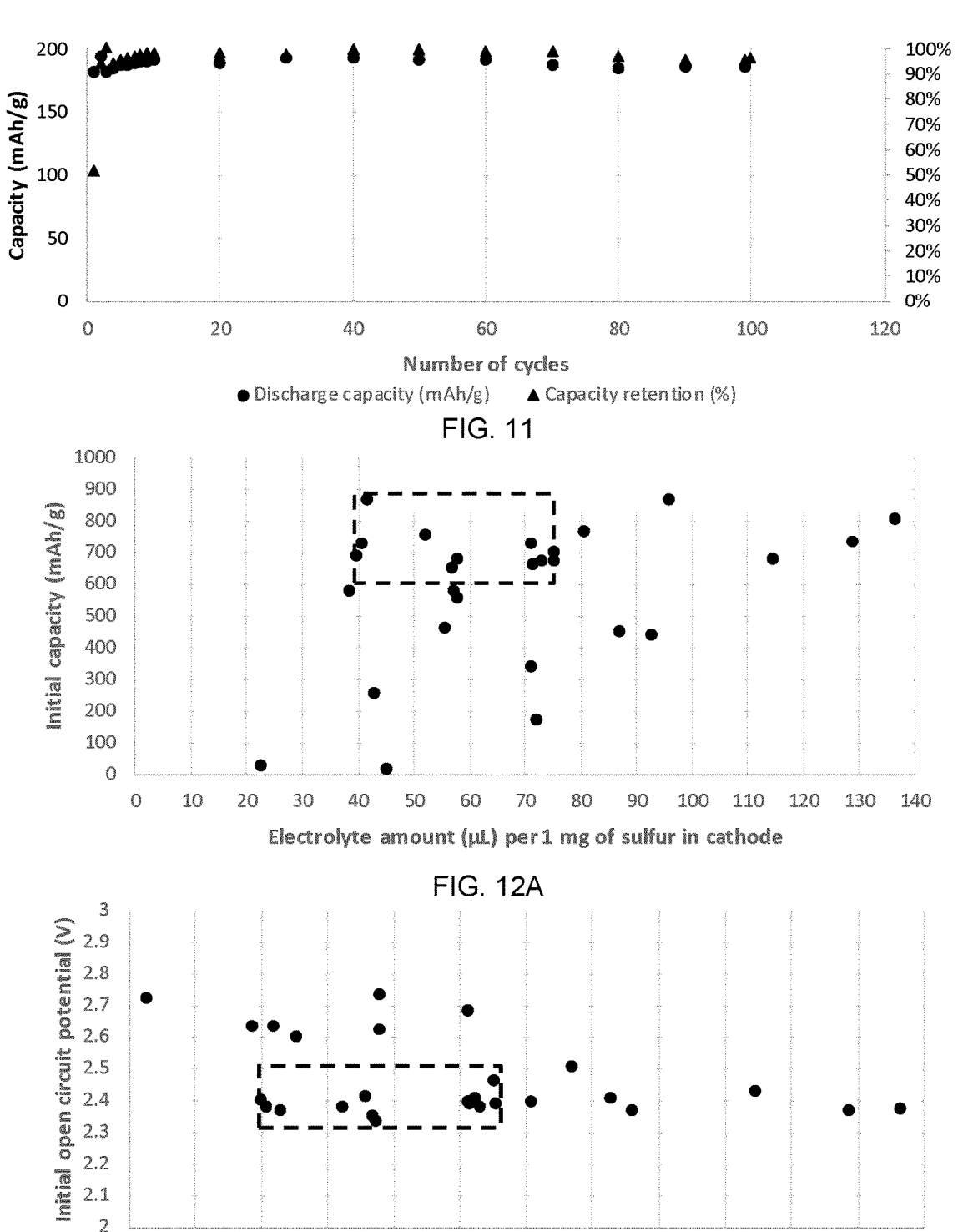
FIG. 11 shows the discharge capacity (mAh/g) and capacity retention (%) of another representative LiS battery cell cycled in the soluble range (75% DoD) for 100 cycles of charge and discharge.
FIGS. 12A, 12B and 12C show the determination of a minimum ratio of electrolyte to sulfur mass.

FIG. 11 shows discharge capacity (mAh/g) and capacity retention (%) of S11-6 (another cell representative for the CAC+50% S group) when tested across the soluble voltage ranging from 1.96V to 3.0V. The capacity averaged 187.7 mAh/g and was maintained over 184 mAh/g when applied at a current density of 1,675 mA/g (or 1.0 C/g) and the capacity retention was 96.0% at the 100th cycle (185.4 mAh/g).

Example 3—Optimization of Ratio of Electrolyte Volume to Sulfur Mass in Cathodes Most previous literature has reported that a ratio of electrolyte volume to sulfur mass in the cathode strongly affects the cyclability of LiS batteries. When the electrolyte is added in an excess amount in the LiS battery, the excess amount can promote the migration of soluble polysulfides from the cathode to the anode (referred to as the shuttle

TABLE 5

Reduction of sulfur to polysulfides during discharge in the LiS battery system.

| Each reduction of sulfur to polysulfides during discharge | Species of polysulfides after each reduction during discharge | Solubility in electrolyte | Soluble voltage range |
|---|---|---|---|
| $2Li^+ + S_8^- + 2e^-$ | $Li_2S_8$ | Soluble | $Li_2S_2$ started forming |
| $2Li^+ + Li_2S_8^- + 2e^-$ | $Li_2S_7$ | Soluble | and depositing $Li_2S_2$ |
| $2Li^+ + Li_2S_7^- + 2e^-$ | $Li_2S_6$ | Soluble | solids on the Li anode at a |
| $2Li^+ + Li_2S_6^- + 2e^-$ | $Li_2S_5$ | Soluble | voltage of less than 1.960 V |
| $2Li^+ + Li_2S_5^- + 2e^-$ | $Li_2S_4$ | Soluble | |
| $2Li^+ + Li_2S_4^- + 2e^-$ | $Li_2S_3$ | Soluble | |
| $2Li^+ + Li_2S_3^- + 2e^-$ | $Li_2S_2$ | Insoluble (solids) | $Li_2S_2$ and $Li_2S$ deposit on the Li anode at <1.960 V |
| $2Li^+ + Li_2S_2^- + 2e^-$ | $Li_2S_1$ | Insoluble (solids) | (polysulfide shuttles) |

Figures 9, 10:
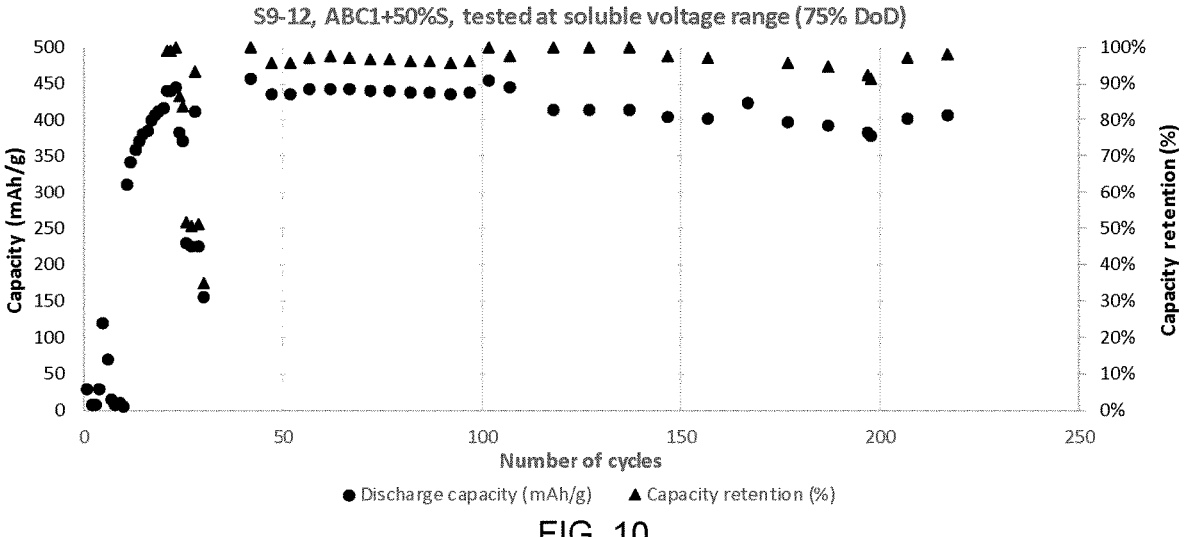
FIG. 9 shows the discharge capacity (mAh/g) and capacity retention (%) of a representative LiS battery cell cycled in the soluble range (75% DoD) for 100 cycles of charge and discharge.
FIG. 10 shows the discharge capacity (mAh/g) and capacity retention (%) of another representative LiS battery cell cycled in the soluble range (75% DoD) for 217 cycles of charge and discharge.

FIG. 9 shows discharge capacity (mAh/g) and capacity retention (%) of S8-5 (another cell representative for the ABC1+60% S group) when tested at a soluble voltage ranging from 1.95V to 3.0V. The capacity averaged 397.0 mAh/g with applied current density (1675 mA/g or 1 C/g), which is a very fast discharge rate. Amazingly, the capacity retention was 98.6% (397.3 mAh/g) at the 100th cycle, indicating nearly no loss in capacitance.

FIG. 10 shows discharge capacity (mAh/g) and capacity retention (%) of S9-12 (another cell representative for the ABC1+50% S group) when also tested at a soluble voltage ranging from 1.96V to 3.0V. The capacity averaged 377.3 mAh/g when applied at a current density (1,675 mA/g or 1.0 C/g) and 422.5 mAh/g when applied at a current density (838 mAh/g or 0.5 C/g), which is used for most practical applications. Once again the capacity retention was high effect), resulting in poor cyclability. Some literature recommended a minimum ratio ranging from 7 to 39 μL per 1 mg of sulfur in the cathode.

The inventors determined a minimum ratio of electrolyte volume (μL) to sulfur mass (mg) in the cathode, referred to as the ES ratio, using an initial open-circuit potential (OCP) (V), which is also referred to as the equilibrium potential after assembly, and capacity. The goal of this study was to determine the highest capacity at a minimum ES ratio.

Figure 12C:
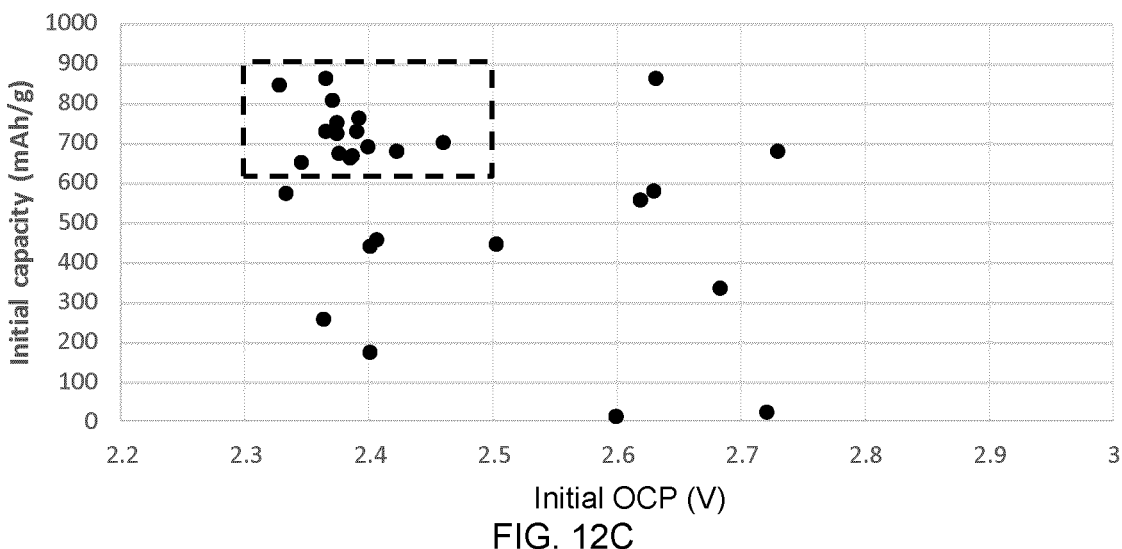

FIG. 12A and FIG. 12B show the highest capacity ranging from 600-860 mAh/g and voltage ranging 2.3 to 2.5 V at an ES ratio of 40-75 (μL/mg of sulfur), respectively. FIG. 12C shows that the highest capacity of 600-860 mAh/g was obtained when the initial OCP was in the 2.3-2.5V range. In FIG. 12A, the box shown in broken lines indicates the approximate capacity ranging from 600-860 mAh/g at an ES ratio of 40-75. In FIG. 12B, the box shown in broken lines indicates the approximate voltage ranging from 2.3 to 2.5 at an ES ratio of 40-75. In FIG. 12C, the box shown in broken lines indicates the approximate capacity ranging from 600-860 mAh/g with an OCP of 2.3 to 2.5 V.

Example 4—Performance of 500 Cycled LiS Batteries with Minimum ES Ratio

Figure 13:
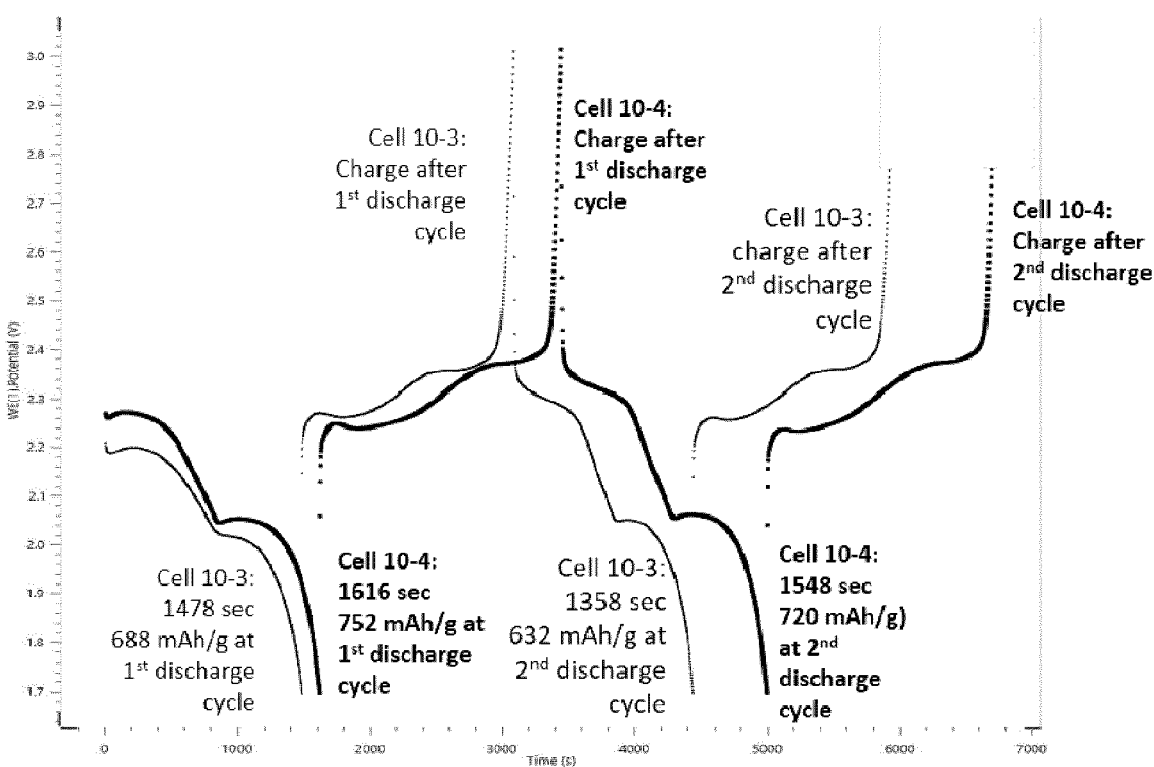
FIG. 13 shows the initial two cycles of galvanostatic charge/discharge (GCD) tested at 1 C/g at 100% depth of discharge (DoD).

FIG. 13 shows the initial two cycles of GCD from LiS batteries with sulfur-impregnated ABC1 (65.25% sulfur content) and a minimum electrolyte amount. These cells were tested at a current density of 1 C/g of active sulfur or 1675 mA/g of active sulfur and 100% depth of discharge (DoD) which ranges voltage from 1.7V to 3.0V. LiS battery cells 10-3 and 10-4 with sulfur impregnated ABC1 achieved an initial capacity ranging 688-720 mAh/g tested 1 C/g (1,675 mA/g) at 100% DoD (1.7-3.0V). These cells (CR 2032, 15 mm in diameter) had the following components:

Sulfur impregnated activated carbon (S-AC): 65.25% in S-AC

Cathode: 60 (AC-S): 20 (graphite): 20 (PVDF) coated on aluminum foil

Electrolyte: 1 M of lithium bis(trifluoromethane sulfonyl) imide (LiN(SO$_2$CF$_3$)$_2$) and 1% lithium nitrate in 1,2-dimethoxyethane (DME) and 1,3-dioxolane (DOXL)

Electrolyte amount used: 40-52 µL per 1 mg of active sulfur in the cathode

Figure 14A:
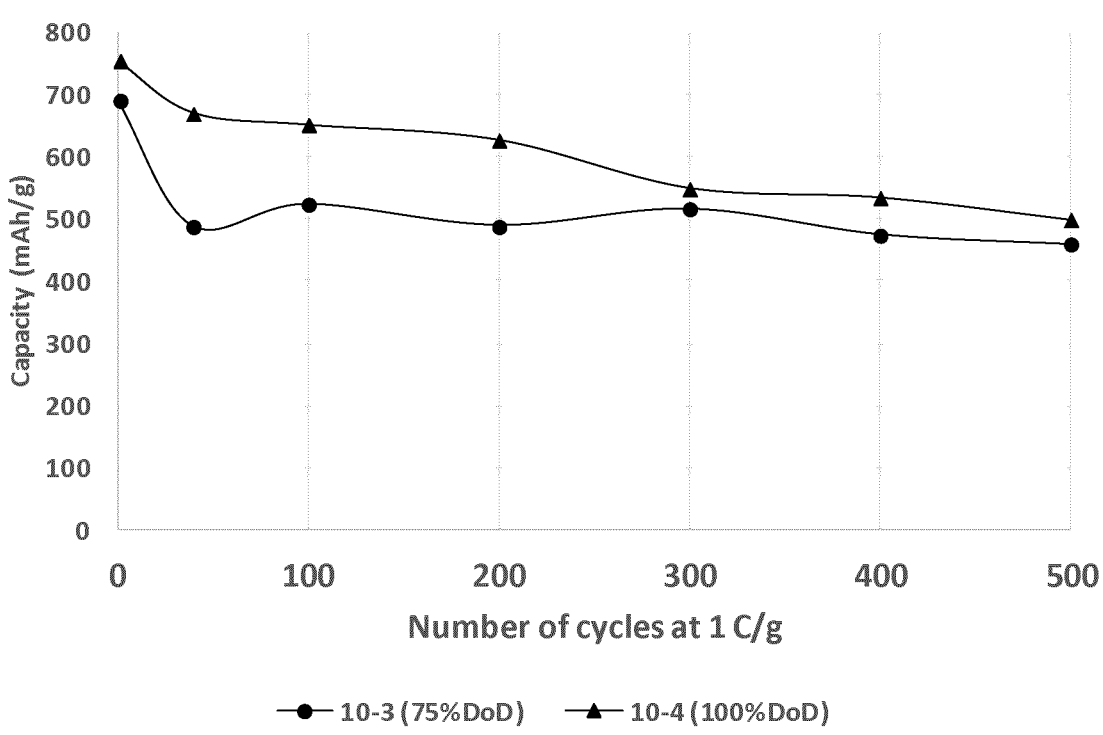
FIGS. 14A, 14B, 14C and 14D show capacity and capacity retention for LiS batteries with sulfur impregnated lignin-based AC through 500 cycles tested at 1 C/g at 100% DoD and 75% DoD, respectively.
Figure 14B:
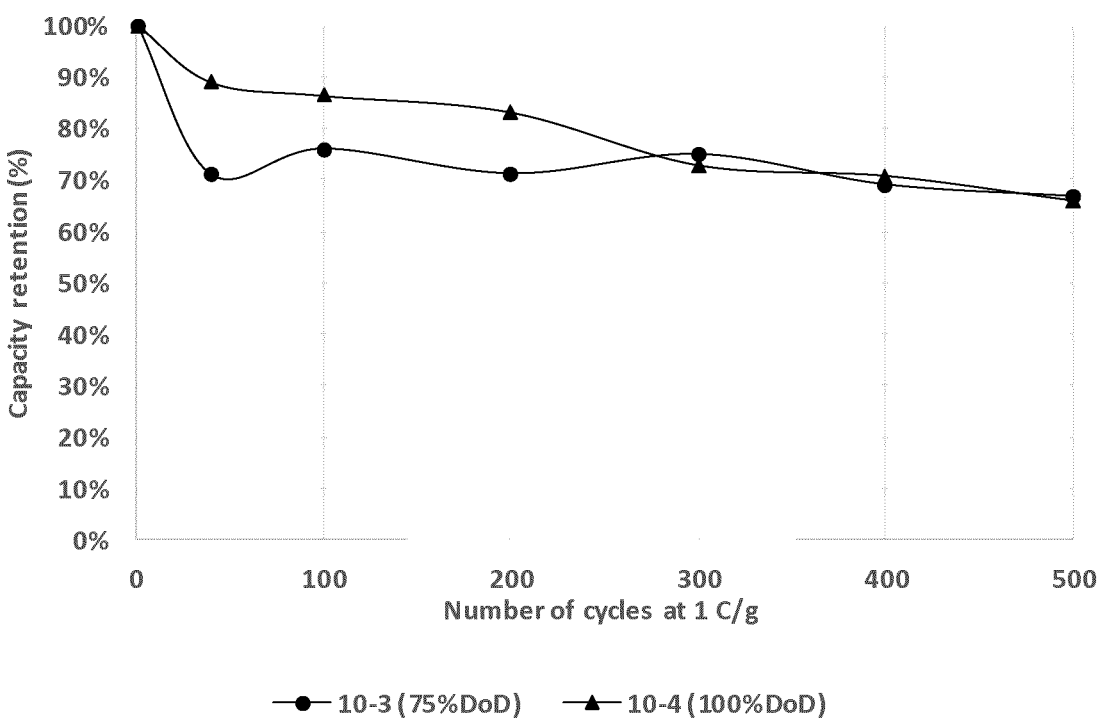

Separator: Celgard 25 micrometer film for both cells in FIG. 13). FIG. 14A shows that Cell 10-3 was GCD-cycled 500 times at a current density of 1 C/g and DoD of 75% (voltage ranging from 1.96 to 3.0V, 458 mAh/g) to avoid shuttle effect, while Cell 10-4 GCD-cycled 500 times at a current density of 1 C/g and DoD of 100% (voltage ranging from 1.7 to 3.0V, 497 mAh/g). FIG. 14B shows the capacitance retention (%) of Cells 10-3 and 10-4 which were calculated based on the initial capacity of each cell (688 mAh/g and 67% for 10-3 (75% DoD) and 752 mAh/g and 66% for Cell 10-4 (100% DoD)).

Figure 14C:
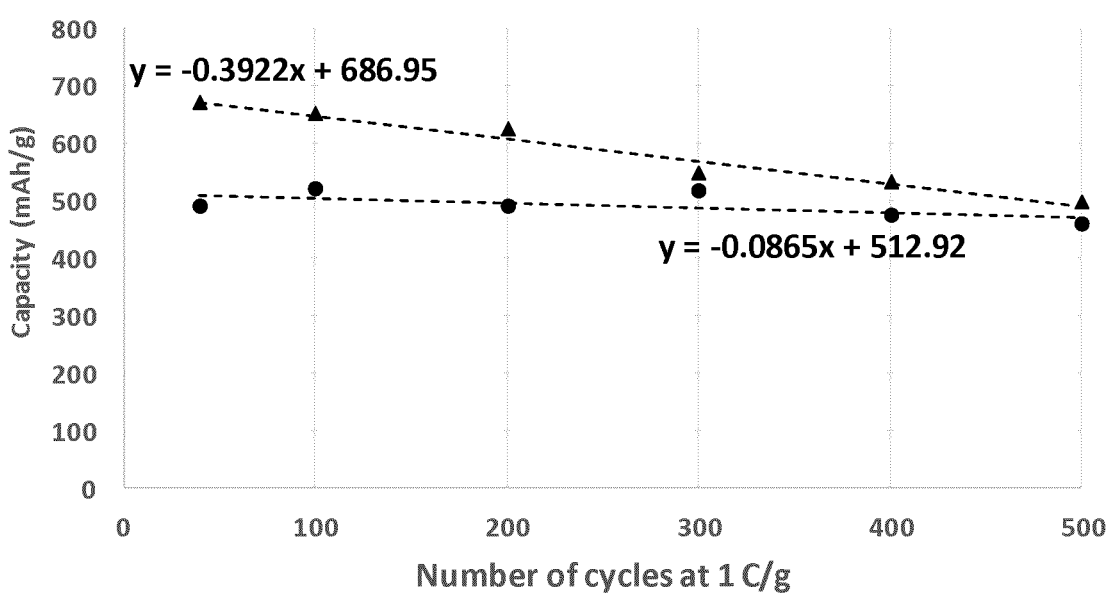
Figure 14D:
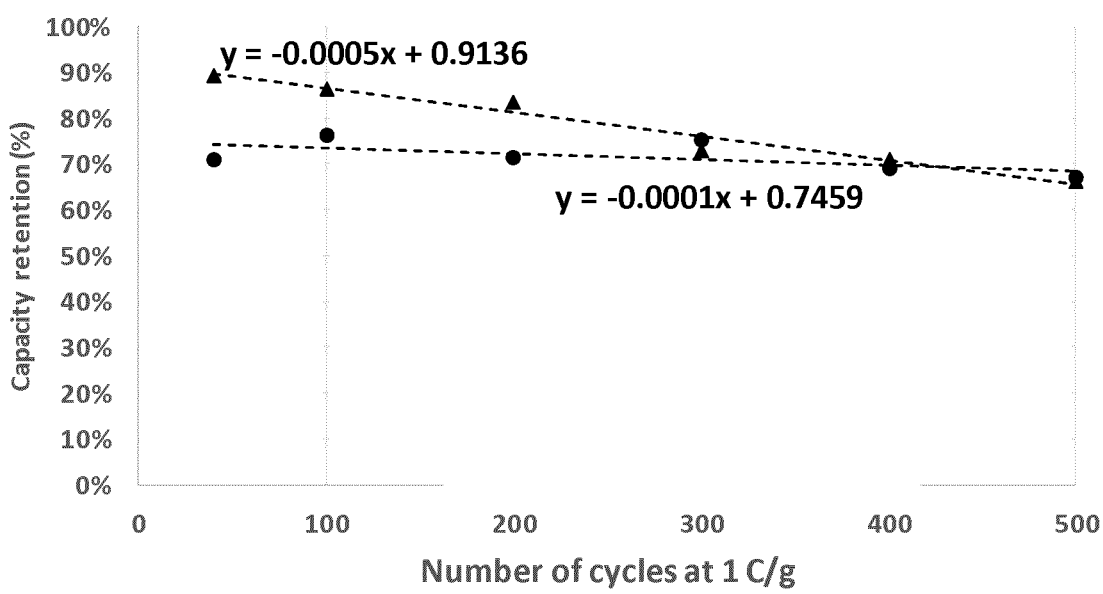

FIGS. 14C and 14D present capacity (mAh/g) (FIG. 14C) and capacity retention (%) (FIG. 14D) from the 40$^{th}$ to 500$^{th}$ cycles, respectively. Cells 10-3 and 10-4 achieved 458 mA (67% capacity retention) at 75% DoD and 497 mAh/g (66% capacity retention) at 100% DoD after 500 cycles, respectively. A capacity decay was −0.0001% per cycle after 40 cycles of Cell 10-3 when tested at 1 C and 75% DoD (1.96-3.0V) which is much slower than a capacity decay (−0.0005% per cycle for Cell 10-4) when tested at 1 C and 100% DoD (1.7-3.0V). The corresponding values represented a decay of −0.0865 mAh/g per cycle for 10-3 at 75% DoD and −0.3922 mAh/g per cycle for 10-4 at 100% DoD.

TABLE 6

LiS batteries with sulfur impregnated lignin-based AC 500 cycled at 1C/g and 100% DoD and 75% DoD, respectively.

| Cell ID | Parameters | # of cycles | | | | | | |
| | | 1 | 40 | 100 | 200 | 300 | 400 | 500 |
|---|---|---|---|---|---|---|---|---|
| 10-3 (75% DoD) | Capacity (mAh/g) | 687.7 | 487.6 | 522.0 | 488.5 | 514.6 | 473.7 | 457.8 |
| | Capacity retention (%) | 100% | 70.9% | 75.9% | 71.0% | 74.8% | 68.9% | 66.6% |
| 10-4 (100% DoD) | Capacity (mAh/g) | 751.9 | 668.6 | 649.1 | 624.8 | 547.4 | 531.8 | 496.0 |
| | Capacity retention (%) | 100% | 88.9% | 86.3% | 83.1% | 72.8% | 70.7% | 66.0% |

Anode: 0.2 mm lithium metal

Table 6 and FIGS. 14A, 14B, 14C and 14D show experimental results for LiS batteries (Cells 10-3 and 10-4) with sulfur impregnated lignin-based activated carbon which were 500 cycled at 1 C/g at 100% DoD and 75% DoD, respectively (following the first two cycles conducted at 100% DoD to establish full capacity for cell 10-3 and shown Using the capacity decay constants derived from Table 6 and FIGS. 14C and 14D, Table 7 summarizes the estimated capacity of cells 10-3 and 10-4 at the 1000$^{th}$ cycle, assuming consistent performance after the 40$^{th}$ cycle. The predicted capacity of cell 10-3 cycled at 75% DoD after the first two cycles would be higher than cell 10-4 cycled at 100% DoD after 1000 charge and discharge cycles.

TABLE 7

Estimated Capacity of Cells 10-3 and 10-4 after 1000 cycles.

| | Inputs | | Capacity decay | | Estimated values | |
| | | | | | | Capacity |
| Cell ID | Initial Cap (mAh/g) | X (# of cycles) | constants | | Y (capacity | (mAh/g) after |
| | | | aX | b | retention %) | 1000 cycles |
|---|---|---|---|---|---|---|
| LC21-10-3 (75% DoD) | 687.7 | 1000 | −0.0001 | 0.7459 | 64.6% | 444 |
| LC21-10-4 (100% DoD) | 751.9 | 1000 | −0.0005 | 0.9136 | 41.4% | 311 |

To summarize, the highest capacity ranging from 600-860 mAh/g with voltage ranging from 2.3 to 2.5 V was obtained when an ES ratio of 40-75 µL/mg of sulfur in the ABC1-based cathode (or cathode with lignin-based AC) was used. Retention of capacitance can at least in some embodiments be maximized by changing to the soluble voltage range or controlling to 75% of the depth of discharge.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method for embedding sulfur into conductive carbon, the method comprising:

dissolving elemental sulfur in liquid ammonia to form a sulfur-ammonia solution;

soaking conductive carbon in the sulfur-ammonia solution to embed the conductive carbon with at least a portion of the dissolved sulfur; and recovering the sulfur-embedded conductive carbon.

2. The method as defined in claim 1, further comprising, after soaking the conductive carbon in the sulfur-ammonia solution but before recovering the sulfur-embedded conductive carbon, removing ammonia from the sulfur-ammonia solution as gaseous ammonia.

3. The method as defined in claim 1, wherein the elemental sulfur is dissolved in the liquid ammonia in a first pressurized environment, optionally wherein the first pressurized environment has a pressure of between about 110 psig and about 135 psig at room temperature.

4. The method as defined in claim 3, wherein the first pressurized environment has a temperature of between –20° C. and 20° C.

5. The method as defined in claim 3, wherein the first pressurized environment has a pressure of between 10 and 15 psig at a temperature of about –20° C.

6. The method as defined in claim 3, wherein the step of soaking the conductive carbon in the sulfur-ammonia solution is carried out in a second pressurized environment, optionally wherein the second pressurized environment has a pressure of about 110 to about 135 psig at room temperature.

7. The method as defined in claim 6, wherein the liquid ammonia in the sulfur-ammonia solution is removed by evaporating liquid ammonia into gaseous ammonia, optionally wherein the liquid ammonia is removed by depressurizing the second pressurized environment.

8. The method as defined in claim 7, wherein the ammonia is recovered through a wet collection method.

9. The method as defined in claim 8, further comprising drying the recovered sulfur-embedded conductive carbon.

10. The method as defined in claim 7, wherein the ammonia is recovered through a dry collection method.

11. The method as defined in claim 7, comprising recovering the gaseous ammonia and compressing the recovered gaseous ammonia back to liquid ammonia.

12. The method as defined in claim 1, wherein the step of dissolving elemental sulfur in liquid ammonia further comprises mixing the sulfur-ammonia solution to encourage solubilization of the elemental sulfur in the liquid ammonia.

13. The method as defined in claim 1, wherein the sulfur-ammonia solution comprises between 5% and 30% by weight of dissolved sulfur.

14. The method as defined in claim 1, further comprising removing any undissolved elemental sulfur from the sulfur-ammonia solution after the step of dissolving the elemental sulfur in the liquid ammonia, optionally by passing the sulfur-ammonia solution through a screen.

15. The method as defined in claim 1, wherein the conductive carbon comprises activated carbon, graphite, graphene, or carbon nanotubes.

16. The method as defined in claim 1, wherein the elemental sulfur comprises $S_8$ and/or granular elemental sulfur; and/or wherein the sulfur-embedded conductive carbon contains between 30% to 85% sulfur by weight, optionally between 50% and 70% sulfur by weight.

17. The method as defined in claim 1, wherein the conductive carbon comprises activated carbon.

18. A method for embedding sulfur into conductive carbon, the method comprising:

soaking conductive carbon in a sulfur-ammonia solution to embed the conductive carbon with at least a portion of the dissolved sulfur.

19. A sulfur-embedded conductive carbon produced by the method as defined in claim 17, containing between 30% to 85% sulfur by weight, optionally between 50% and 70% sulfur by weight.

20. The sulfur-embedded conductive carbon as defined in claim 19, which has a resistance between 2 to 2.5 times higher than a resistance of graphite.

21. The sulfur-embedded conductive carbon as defined in claim 19, wherein the activated carbon is made from lignin.

22. A metal-sulfur battery comprising a sulfur-embedded conductive carbon produced by a method as defined in claim 17 as a sulfur cathode, optionally wherein the metal sulfur battery is a lithium sulfur battery.

* * * * *